US008200297B2

(12) United States Patent
Hankui et al.

(10) Patent No.: US 8,200,297 B2
(45) Date of Patent: Jun. 12, 2012

(54) CELLULAR PHONE

(75) Inventors: Eiji Hankui, Tokyo (JP); Yukio Yokoyama, Saitama (JP); Shinya Nakamura, Saitama (JP); Takuya Kojima, Saitama (JP)

(73) Assignee: NEC Corporation, Tokyo (JP)

( * ) Notice: Subject to any disclaimer, the term of this patent is extended or adjusted under 35 U.S.C. 154(b) by 406 days.

(21) Appl. No.: 12/448,566

(22) PCT Filed: Nov. 29, 2007

(86) PCT No.: PCT/JP2007/073028
§ 371 (c)(1),
(2), (4) Date: Jun. 25, 2009

(87) PCT Pub. No.: WO2008/084606
PCT Pub. Date: Jul. 17, 2008

(65) Prior Publication Data
US 2009/0291721 A1    Nov. 26, 2009

(30) Foreign Application Priority Data
Jan. 11, 2007    (JP) .................................. 2007-003603

(51) Int. Cl.
*H04M 1/00* (2006.01)
(52) U.S. Cl. ............... 455/575.3; 455/575.1; 455/575.7; 343/836; 343/837
(58) Field of Classification Search .................. 455/90.3, 455/550.1, 575.1, 575.3, 575.7; 343/836, 343/837, 841, 912
See application file for complete search history.

(56) References Cited

U.S. PATENT DOCUMENTS

| 6,745,057 B1 | 6/2004 | Hankui |
| 7,171,248 B1 * | 1/2007 | Brown ........................ 455/575.5 |
| 2004/0162122 A1 * | 8/2004 | Lee ............................. 455/575.7 |

FOREIGN PATENT DOCUMENTS

| JP | 2000-323921 | 11/2000 |
| JP | 2002-232316 | 8/2002 |
| JP | 2002-319808 | 10/2002 |
| JP | 2004-297535 | 10/2004 |
| JP | 3642029 | 2/2005 |
| JP | 2005-217917 | 8/2005 |
| JP | 2006-33355 | 2/2006 |
| JP | 2006-54843 | 2/2006 |
| JP | 3838815 | 8/2006 |

* cited by examiner

*Primary Examiner* — Tuan H Nguyen
(74) *Attorney, Agent, or Firm* — McGinn IP Law Group, PLLC

(57) ABSTRACT

A cellular phone includes upper casing 2 having a front surface with LCD panel 21 disposed thereon, lower casing 3 having a front surface with key pad 22 disposed thereon, and an antenna, upper and lower casings 2, 3 being openably and closably coupled to each other. First control plate 10 for reflecting electromagnetic waves is disposed in upper casing 2, and second control panel 11 for reflecting electromagnetic waves is disposed in lower casing 3. First control plate 10 and second control plate 11 comprise separate members which are independent of each other. When the cellular phone is in an unfolded state in which the angle formed between the front surface of upper casing 2 and the front surface of the lower casing 3 is maximum, first control plate 10 and second control plate 11 have a maximum projected area on the surfaces of upper and lower casings 2, 3.

22 Claims, 32 Drawing Sheets

FIG. 10
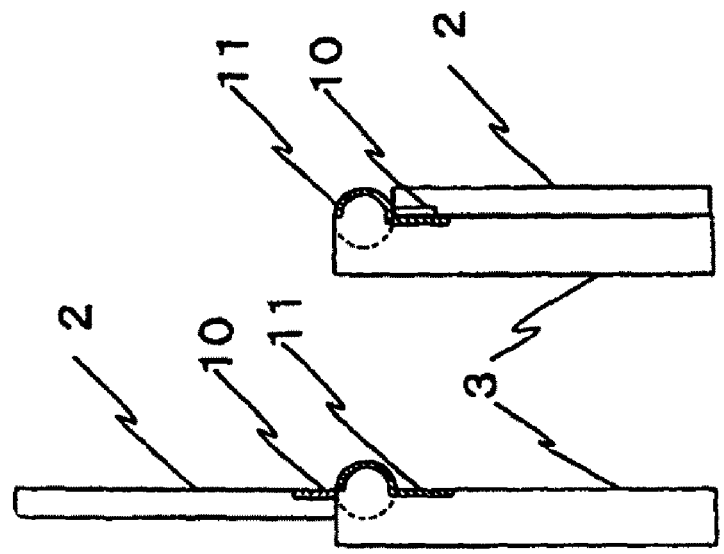
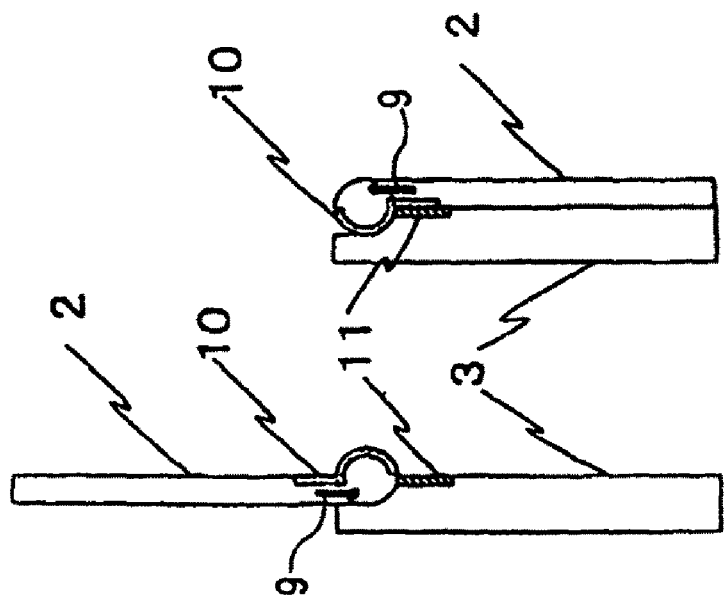

FIG. 12
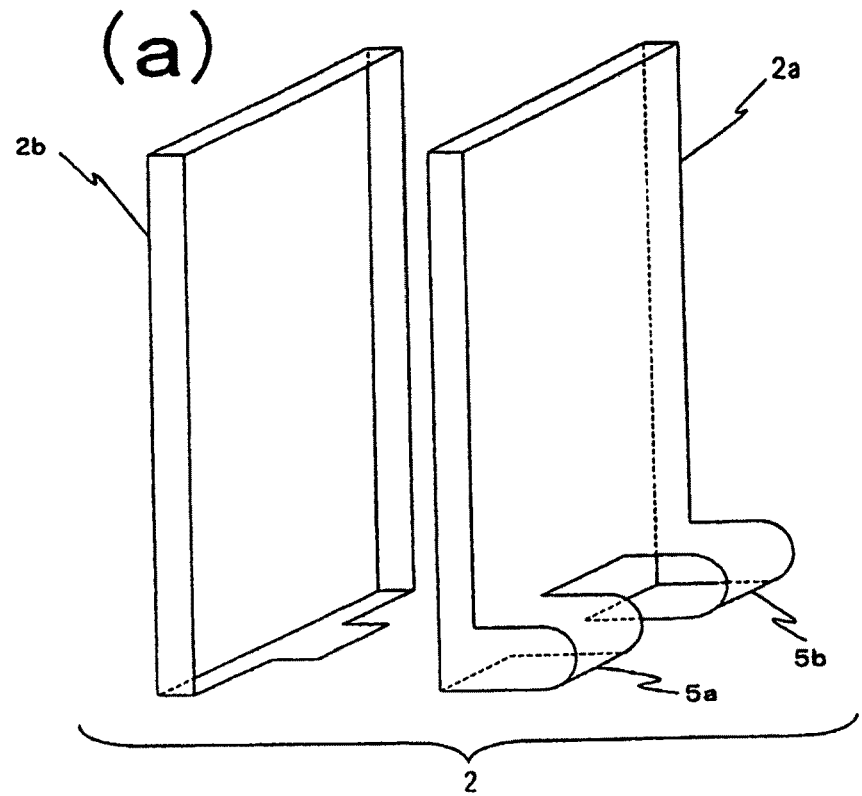
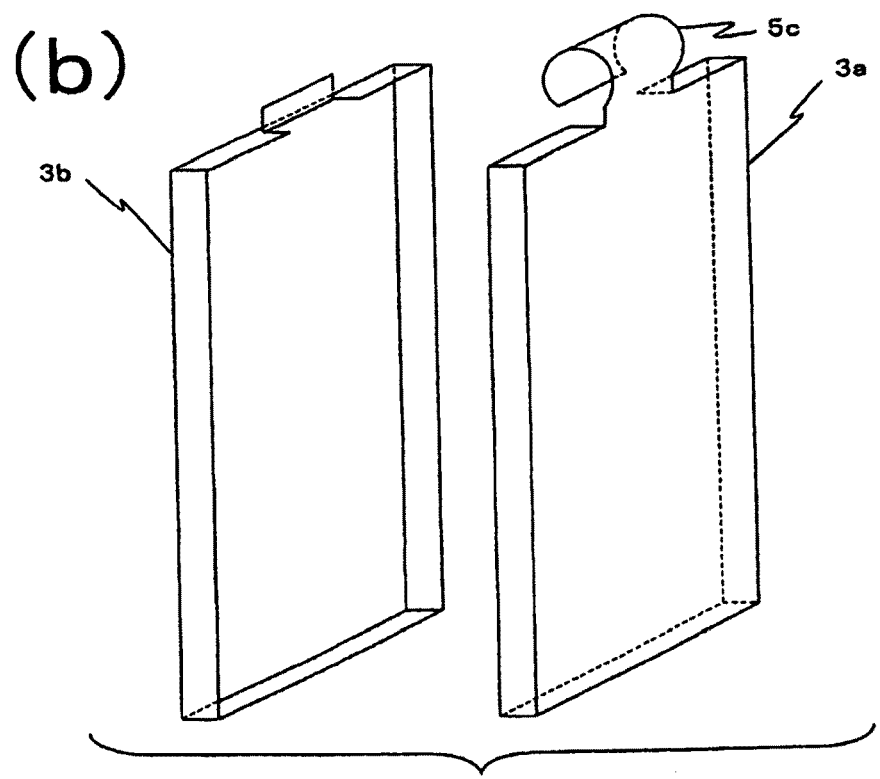

FIG. 15
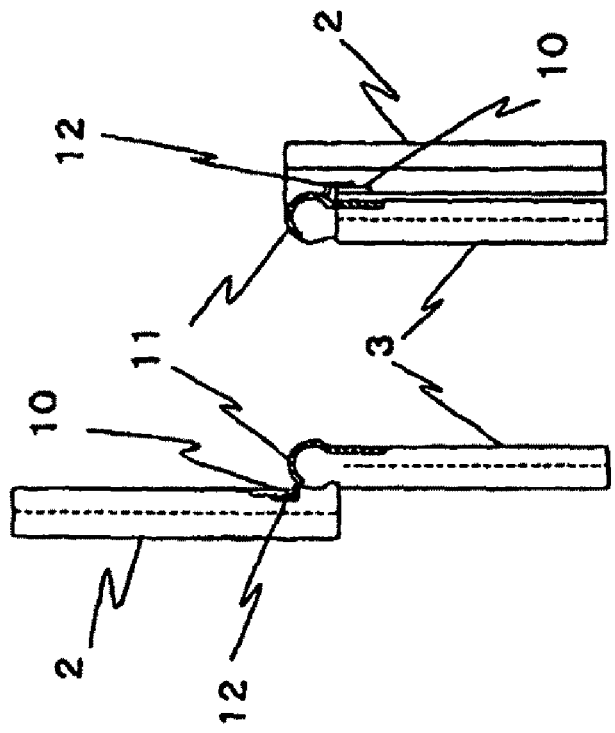
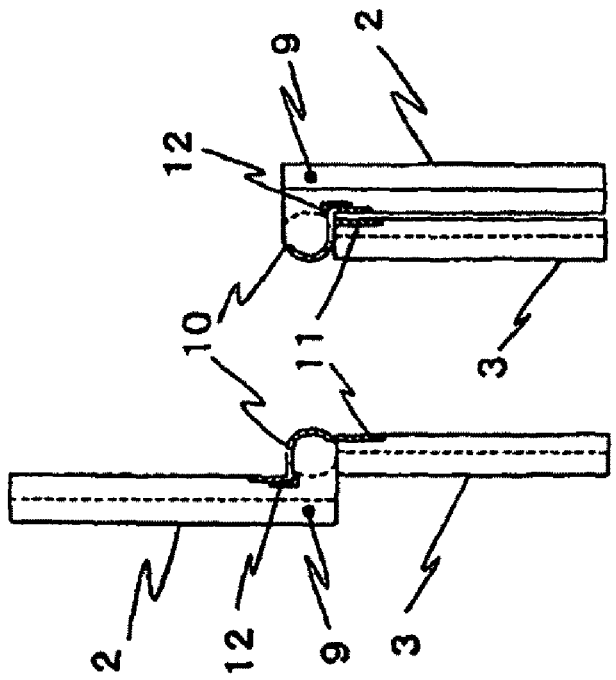

FIG. 21
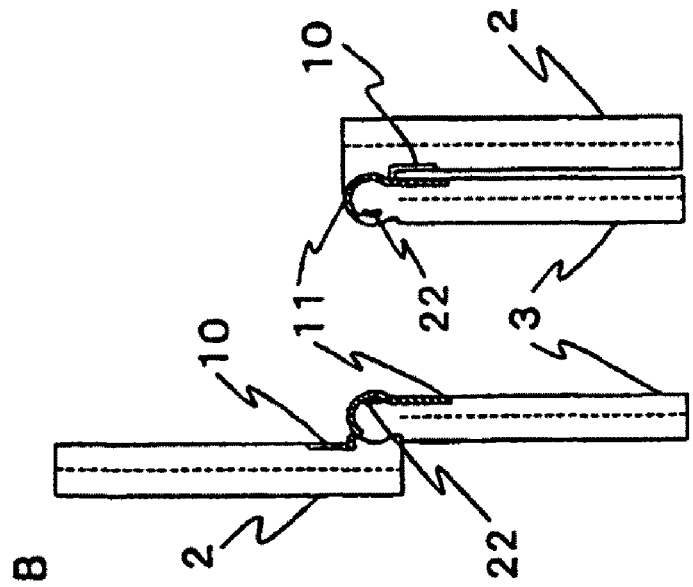
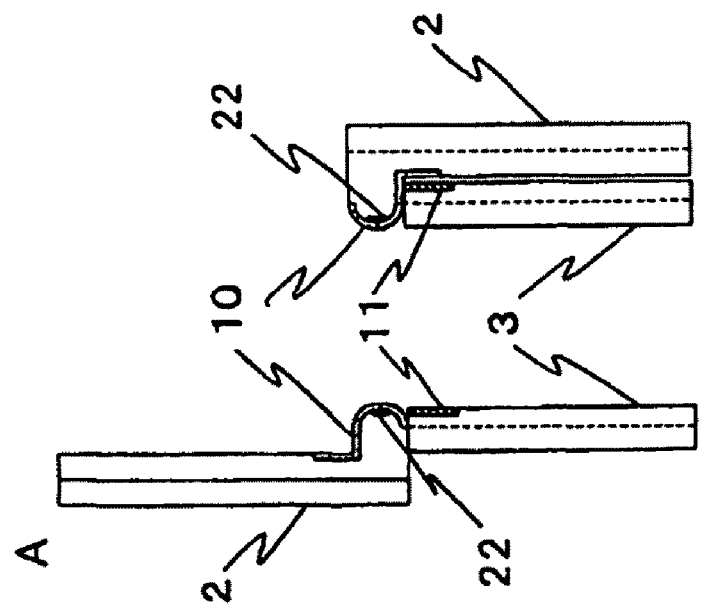

FIG. 26
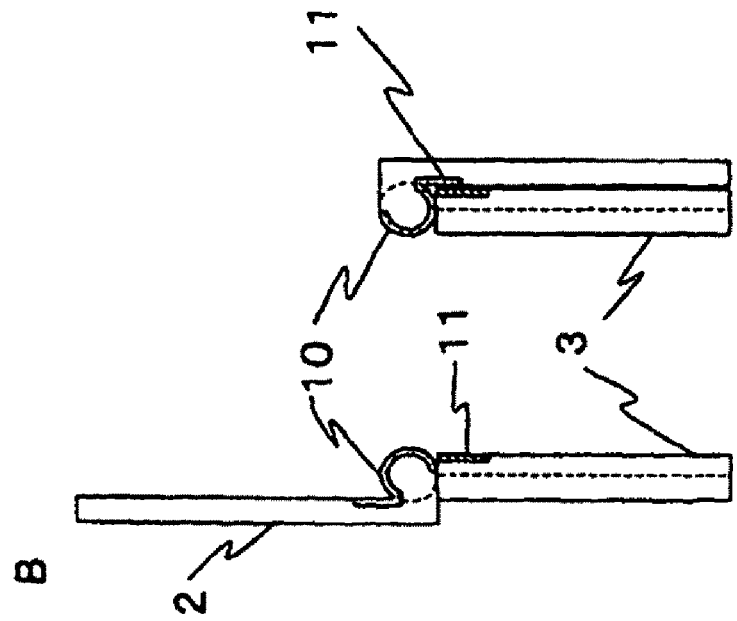
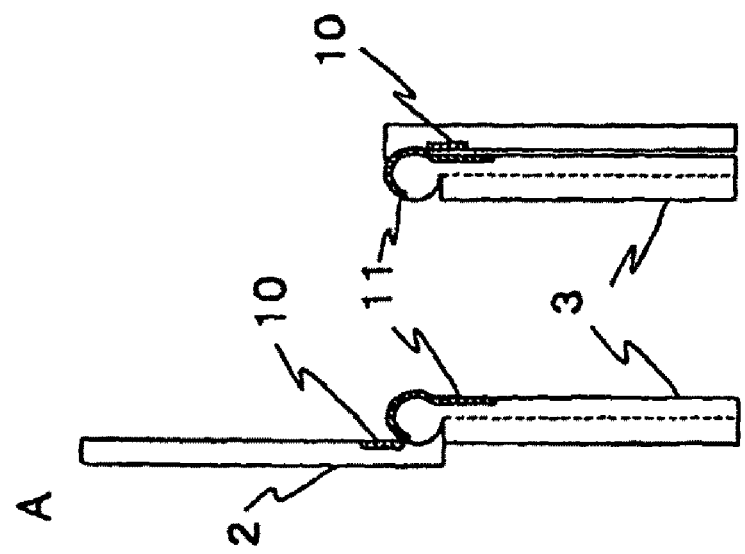

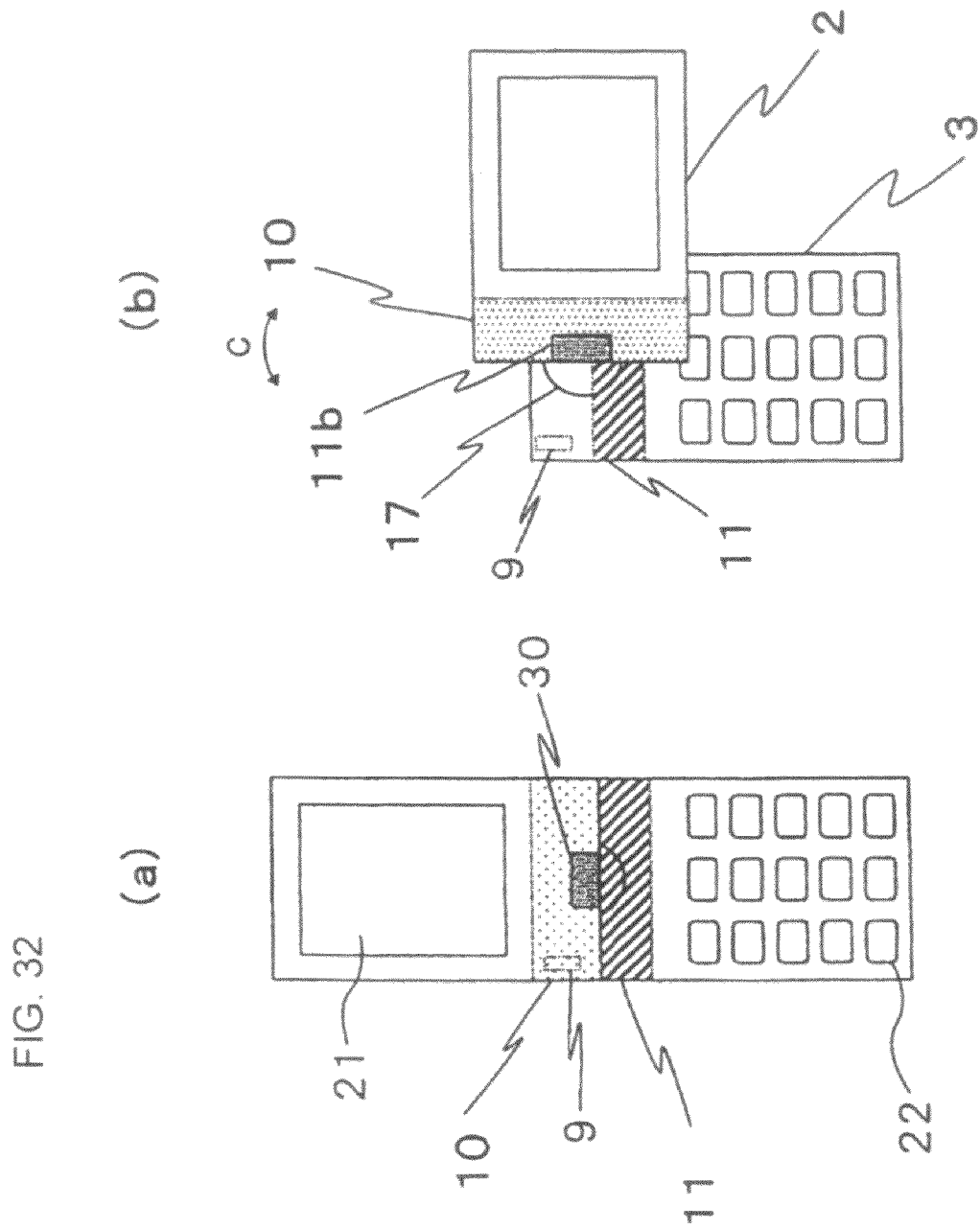

CELLULAR PHONE

TECHNICAL FIELD

The present invention relates to a portable device for sending and receiving radio waves, and more particularly to a cellular phone.

BACKGROUND ART

The basic structure of a general cellular phone will be described below. FIG. 1 is a set of schematic views showing the basic structure of foldable cellular phone 1. Specifically, FIG. 1(a) is a front elevational view of foldable cellular phone 1. FIG. 1(b) is a set of a front elevational view and a side elevational view of upper casing 2. FIG. 1(c) is a set of a front elevational view and a side elevational view of lower casing 3.

As shown in FIG. 1(a), cellular phone 1 comprises upper casing 2 positioned upwardly of hinge 4 and lower casing 3 positioned downwardly of hinge 4. Upper casing 2 and lower casing 3 have hollow box shapes, respectively. Upper casing 2 and lower casing 3 are often made of a nonmetallic material such as resin, plastic, or the like.

LCD panel 21 serving as a display means, a speaker, not shown, etc. are disposed on one surface of upper casing 2. Key pad 22 serving as an operating means, a microphone, not shown, etc. are disposed on one surface of lower casing 3. In the present specification, of the surfaces of cellular phone 1 (upper casing 2 and lower casing 2), the surface on which LCD panel 21 and key pad 22 are disposed will be referred to as a front surface, and the surface opposite to the front surface as a rear surface.

FIG. 2 is a set of views showing only the casings of cellular phone 1. FIG. 2(a) is a cross-sectional view taken along line A-A of FIG. 1(a), and FIG. 2(b) is a cross-sectional view taken along line B-B of FIG. 1(a). Break line A-A shown in FIG. 1(a) represents a straight line passing through left half hinge 5a to be described later, and break line B-B a straight light passing through central half hinge 5c.

Referring back to FIG. 1, as shown in FIGS. 1(b) and 1(c), upper casing 2 has on its lower end substantially semicylindrical hinges (half hinges 5a, 5b) disposed respectively at left and right ends thereof. Lower casing 3 has on its upper end half hinge 5c, similar to half hinges 5a, 5b, disposed at its center. Half hinges 5a, 5b, 5c are essentially equal in contour and diameter to each other. Lower casing 3 also has indented surfaces 6a, 6b on both opposite outer sides of half hinge 5c complementarily in contour to half hinges 5a, 5b of upper casing 2. Indented surfaces 6a, 6b have such a depth and a shape that when half hinges 5a, 5b are placed on half hinges 5a, 5b, adjacent ones of half hinges 5a, 5b, 5c are superposed on each other at substantially the same height.

Half hinges 5a, 5b, 5c are referred to as "half hinges" because they have a shape corresponding to substantially one-half of a cylinder. Even if they have a shape corresponding to a portion of a cylinder (more or less than one-half thereof or a nearly prismatic shape, they will also be referred to as "half hinges" in the description which follows.

As shown in FIG. 1(a), upper casing 2 and lower casing 3 are openably and closably coupled integrally to each other by hinge assembly 4 which is made up of half hinges 5a, 5b, 5c. Hinge assembly 4 includes a coupling mechanism by which upper casing 2 and lower casing 3 are openably and closably coupled to each other. For example, hinge assembly 4 includes a cylindrical shaft extending through half hinges 5a, 5b, 5c. The coupling mechanism is omitted from illustration in FIG. 1.

FIG. 3 shows typical states in which cellular phone 1 is used. FIG. 3(a) shows an unfolded state in which the angle formed between the front surface of upper casing 2 and the front surface of lower casing 3 is maximum. FIG. 3(b) shows a folded state in which the above angle is minimum. Generally, cellular phone 1 is in the unfolded state when the person using it makes a call with the speaker of cellular phone 1 being close to the ear (during the call). On the other hand, cellular phone 1 is in the folded state when it is placed in a pocket or a bag (in the standby mode). When cellular phone 1 is in the unfolded state shown in FIG. 3(a), the angle formed between the front surfaces of upper casing 2 and lower casing 3 is about 180°. However, the angle may be smaller than 180° or greater than 180°.

As shown in FIGS. 3(a) and 3(b), upper casing 2 and lower casing 3 incorporate upper printed-circuit board 7 and lower printed-circuit board 8 respectively therein which support a radio circuit and a control circuit (not shown) thereon. Signals are sent and received between printed-circuit boards 7, 8 through a cable (a flexible cable or a coaxial cable) extending through hinge assembly 4 and connected to printed-circuit boards 7, 8. The cable is omitted from illustration.

FIG. 3(c) shows the position of antenna 9 included in cellular phone 1. Antenna 9 is disposed near hinge assembly 4 and connected to upper printed-circuit board 7. Specifically, antenna 9 is connected to a pad or a spring (power supply 13) on the lower end of upper printed-circuit board 7. Transmission power is supplied to antenna 9 through electrode supply 13 and reception power is transmitted from antenna 9 to the radio circuit.

Upper printed-circuit board 7 supports thereon a matching circuit (not shown) for adjusting the impedance of antenna 9 to match a desired impedance in upper printed-circuit board 7. The impedance matching allows radio waves to be transmitted from antenna 9 and received from antenna 9 efficiently.

During the call, the human body is present near the antenna of the cellular phone. Therefore, a portion of electromagnetic waves (electric power) radiated from the antenna is absorbed by the human body, resulting in a reduction in the antenna radiation efficiency that serves as an indicator of antenna performance. Specifically, if it is assumed that the electric power input to the antenna is represented by "Pin", the electric power radiated into space by "Pr", and the electric power absorbed from the radiated electric power by the human body (lost electric power) by "Ploss", then the antenna radiation efficiency ($\eta$) during the call is expressed by the following equation (the loss of the antenna itself is ignored):

$$\eta = Pr/Pin = (Pin - Ploss)/Pin = 1 - (Ploss/Pin)$$

Therefore, the lost electric power (Ploss) needs to be reduced in order to increase the antenna radiation efficiency during the call and improve the communication capability of the cellular phone.

Japanese patent No. 3838815 and Japanese patent No. 3642029 disclose a technology for placing a plate of magnetic material or metal in a space between an antenna and the human body, as a means for increasing the antenna radiation efficiency.

According to the technology disclosed in Japanese patent No. 3838815 and Japanese patent No. 3642029, an electromagnetic wave radiated from the antenna is reflected by the surface of the plate of magnetic material or metal, developing a reduced electromagnetic field in an area behind the plate. In other words, it is possible to reduce the electromagnetic wave that is applied to the human body which is positioned remotely from the antenna with the plate of magnetic material or metal interposed therebetween. As a result, the lost electric power (Ploss) is reduced. The plate of magnetic material or metal functions as a type of electromagnetic wave shield for controlling the electromagnetic field behind the plate. In the present specification, a member which performs such a function may be referred to as "control plate" or "electromagnetic field control plate".

Many cellular phones available recently are of the foldable type, with an antenna being often installed near the hinge assembly due to packaging space limitations. For sufficiently maximizing the effect of the electromagnetic field control plate, it is necessary to cover a relatively wide area including the antenna installed area with the electromagnetic field control plate. Preferably, the electromagnetic field control plate is disposed over an area extending from a lower portion of the upper casing through the hinge assembly to an upper portion of the lower casing.

FIGS. 4(a) and 4(b) show an example in which an electromagnetic field control plate is applied to cellular phone 1 shown in FIG. 1. For increasing the antenna radiation efficiency during the call, electromagnetic field control plate 14 is preferably disposed to cover antenna 9 and a relatively wide area therearound, as described above. Consequently, electromagnetic field control plate 14 is placed so as to extend in upper casing 2 and lower casing 3 through hinge assembly 4. Specifically, through holes have shapes and sizes for allowing electromagnetic field control plate 14 to pass therethrough are defined in upper and lower casings 2, 3, and electromagnetic field control plate 14 is disposed as described above.

DISCLOSURE OF THE INVENTION

Problems to be Solved by the Invention

However, the electromagnetic field control plate that is disposed so as to extend in the upper casing and the lower casing poses the following problems: In order to make the upper casing and the lower casing openable and closable, it is necessary that the electromagnetic field control plate be pliable (see FIG. 4(b)). However, even if the electromagnetic field control plate is pliable, it may be caught in the hinge assembly, tending to prevent the upper casing and the lower casing from being smoothly opened and closed. If the upper casing and the lower casing are forcibly opened and closed while the electromagnetic field control plate is being caught somewhere, then the electromagnetic field control plate may possibly be broken.

One way of improving the above problems is to place the electromagnetic field control plate by effectively utilizing the space in the hinge assembly. An example of such placement is shown in FIGS. 5(a) and 5(b). FIG. 5(a) shows a folded state, and FIG. 5(b) an unfolded state. As shown in FIG. 5(b), electromagnetic field control plate 14 which is highly flexible is disposed so as to extend in upper and lower casings 2, 3 through hinge assembly 4. Electromagnetic field control plate 14 has an upper portion fixed to a flat region of an inner wall surface of upper casing 2, and a lower portion fixed to a flat region of an inner wall surface of lower casing 3. In addition, electromagnetic field control plate 14 has a central portion extending along an inner circumferential surface of hinge assembly 4, but not fixed so that its shape can be changed relatively freely.

In the folded state shown in FIG. 5(a), the central portion of electromagnetic field control plate 14 is disposed along the inner wall surface of hinge assembly 4 without overlapping itself. In the unfolded state shown in FIG. 5(b), electromagnetic field control plate 14 is folded back, partly overlapping itself, in hinge assembly 4.

With the placement shown in FIG. 5, electromagnetic field control plate 14 does not prevent upper casing 2 and lower casing 3 from being opened and closed. However, the placement shown in FIG. 5 suffers a new problem. As shown in FIG. 5(a), when the cellular phone is folded, electromagnetic field control plate 14 which is made of a magnetic material or metal forms a current loop. When a current loop is developed, a magnetic field generated by the loop current is unnecessarily electromagnetically coupled to the antenna and the circuits.

FIG. 6 is a set of views showing the behavior of a magnetic field generated from electromagnetic field control plate 14. FIG. 6(a) shows the manner in which the magnetic field generated from electromagnetic field control plate 14 and antenna 9 are electromagnetically coupled to each other. FIG. 6(b) shows the manner in which the magnetic field generated from electromagnetic field control plate 14 and printed-circuit boards 7, 8 are electromagnetically coupled to each other.

When an electromagnetic wave is radiated from antenna 9 shown in FIG. 6(a), it induces an electric current in electromagnetic field control plate 14 which is disposed in the vicinity of antenna 9. As the induced electric current flows in a vertical direction (z direction) on the sheet of FIG. 6(a), electromagnetic field control plate 14 acts as an inductor because it is shaped as a loop. As a result, a magnetic field (represented by lines 15 of magnetic force in FIG. 6) is generated, and lines 15 of magnetic force cross antenna 9 which is positioned in the vicinity thereof. An electromagnetic coupling is then developed between antenna 9 and electromagnetic field control plate 14, bringing about adverse effects such as a change in the impedance of antenna 9.

As shown in FIG. 6(b), in addition to antenna 9, upper printed-circuit board 7 and lower printed-circuit board 8 are disposed in the vicinity of electromagnetic field control plate 14. These boards 7, 8 support thereon devices and modules which process weak signals. The magnetic field (lines 15 of magnetic force) generated from electromagnetic field control plate 14 produces noise in the devices and the modules, adversely affecting their characteristics and performance.

According to the background art and one of the technologies that are presumed based thereon, as described above, it is difficult to improve the antenna radiation efficiency while keeping the upper casing and the lower casing smoothly openable and closable. According to the background art and another one of the technologies that are presumed based thereon, a current loop is formed when the cellular phone is folded, tending to adversely affect the antenna characteristics and the device characteristics.

Means for Solving the Problems

A cellular phone according to the present invention includes a first casing having a front surface with at least a display panel disposed thereon, a second casing having a front surface with at least operating keys disposed thereon, and an antenna disposed in the first casing or the second casing, the first casing and the second casing being openably and closably coupled to each other. A first reflective member for reflecting electromagnetic waves is disposed in the first casing. A second reflective member for reflecting electromagnetic waves is disposed in the second casing. The first reflective member and the second reflective member comprise different members which are independent of each other. When the cellular phone is in an unfolded state in which the angle formed between the front surface of the first casing and the front surface of the second casing is maximum, the first reflective member and the second reflective member have a maximum projected area on a surface of the first casing and the second casing.

Another cellular phone according to the present invention includes a first casing having a front surface with at least a display panel disposed thereon, a second casing having a front surface with at least operating keys disposed thereon, and an antenna disposed in the first casing or the second casing, the first casing and the second casing being openably and closably coupled to each other. A reflective member for reflecting electromagnetic waves is disposed in either the first casing or the second casing. When the cellular phone is in an unfolded state in which the angle formed between the front surface of the first casing and the front surface of the second casing is maximum, a magnetic field on a side of the reflective member which is remote from the antenna is smaller than a magnetic field on a side of the reflective member which is close to the antenna.

It is an object of the present invention to improve antenna radiation efficiency without preventing an upper casing and a lower casing from being opened and closed and also without adversely affecting antenna characteristics and device characteristics.

The above and other objects, features, and advantages of the present invention will become more apparent from the following description when taken in conjunction with the accompanying drawings in which exemplary embodiments of the present invention are shown by way of illustrative example.

BRIEF DESCRIPTION OF THE DRAWINGS

FIGS. 10(a) and 10(b) are schematic views showing different cross sections of the cellular phone according to exemplary embodiment 1 when it is unfolded and folded;

FIG. 12(a) is a schematic exploded perspective view of an upper casing of a cellular phone according to exemplary embodiment 2, and FIG. 12(b) is a schematic exploded perspective view of a lower casing thereof;

FIGS. 15(a) and 15(b) are schematic views showing different cross sections of the cellular phone according to exemplary embodiment 2 when it is unfolded and folded;

FIG. 21 is a set of schematic views showing different cross sections of the cellular phone shown in FIG. 19 when it is unfolded and folded;

FIG. 22(b) is an enlarged perspective view of the first control plate, the auxiliary control plate, and the second control plate when the cellular phone is folded;

FIG. 26 is a set of schematic views showing different cross sections of the cellular phone according to exemplary embodiment 3 when it is unfolded and folded;

FIG. 27(b) is an enlarged perspective view of the first control plate and the second control plate shown in FIG. 26 when the cellular phone is folded;

FIG. 32 is a set of schematic views showing the manner in which electromagnetic field control plates are disposed when the cellular phone shown in FIG. 28 is unfolded.

BEST MODE FOR CARRYING OUT THE INVENTION

Exemplary Embodiment 1

Figure 1:
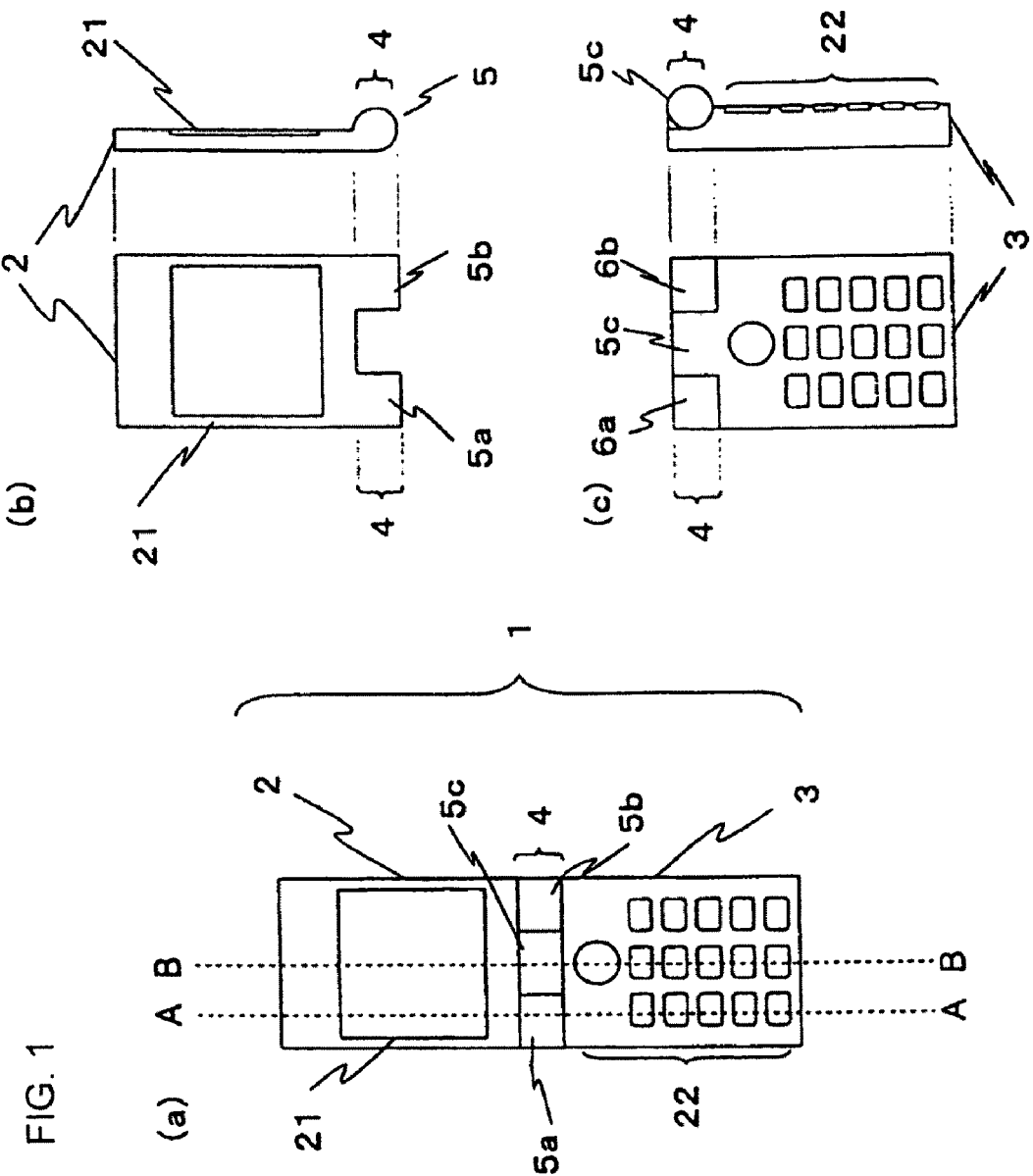
FIG. 1 is a set of schematic front elevational views showing the basic structure of a general cellular phone.
Figure 2:
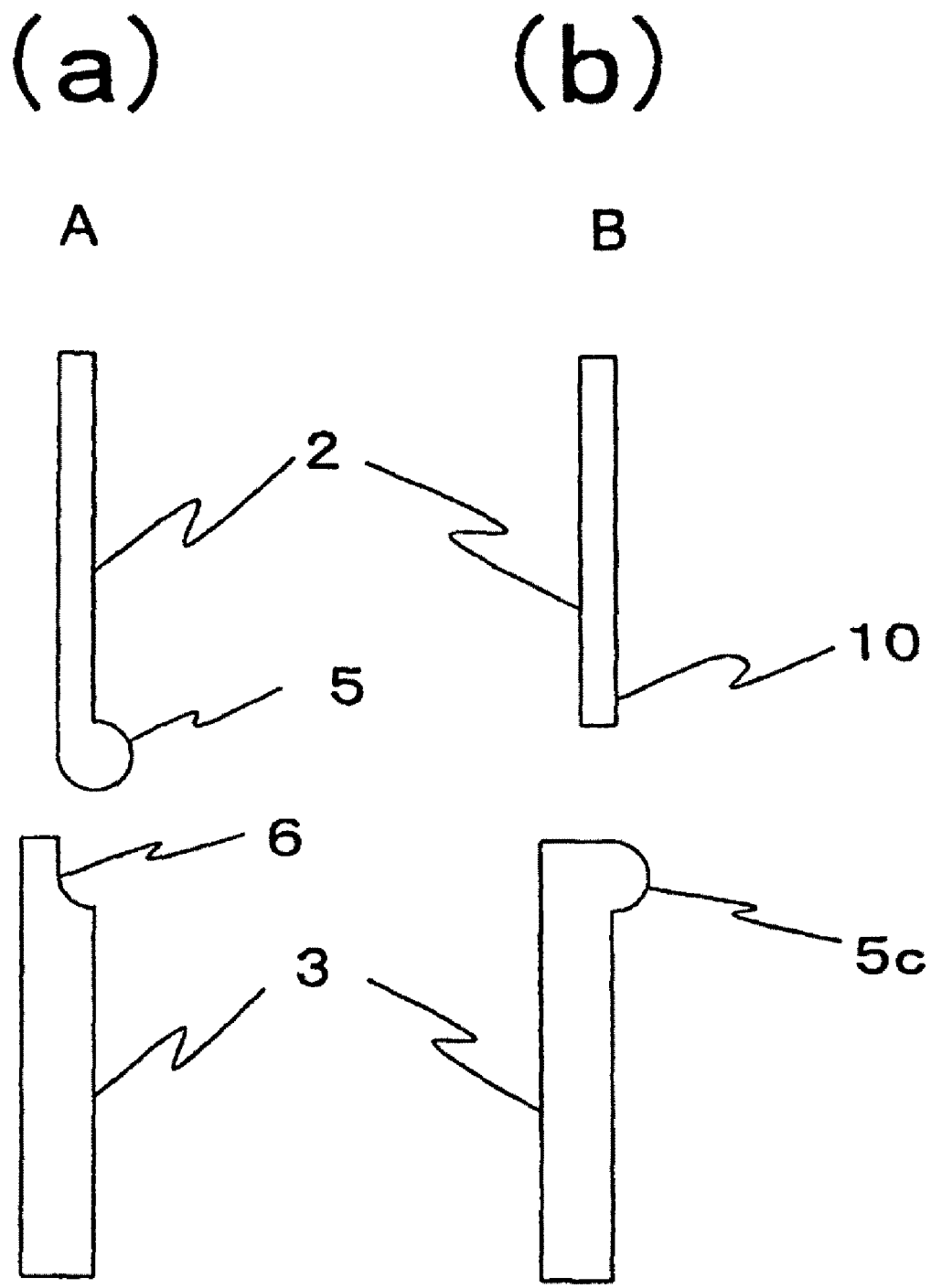
FIG. 2 is a set of schematic views showing different cross sections of an upper casing and a lower casing shown in FIG. 1.
Figure 3:
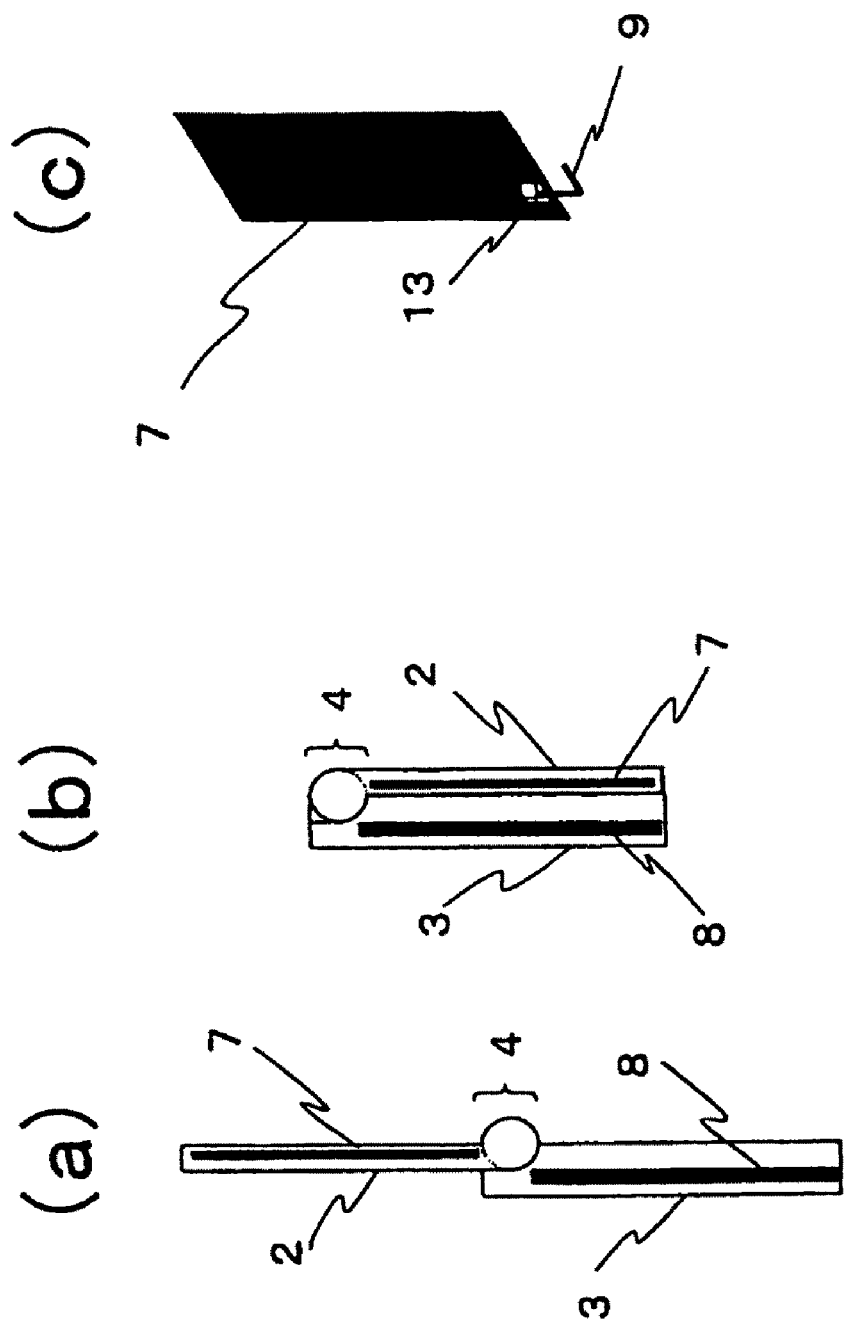
FIG. 3 is a set of schematic views showing internal structural details of the cellular phone shown in FIG. 1.
Figure 4:
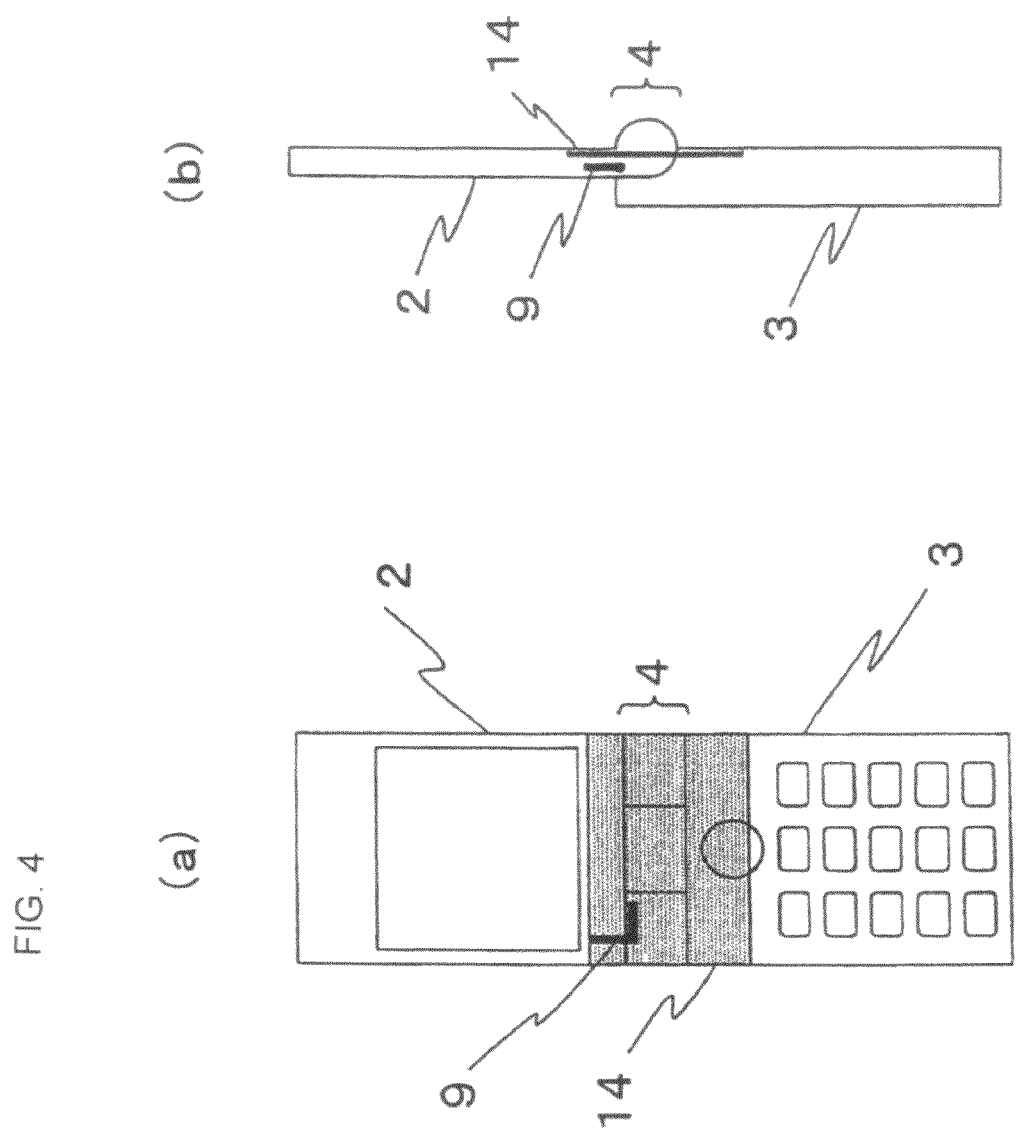
FIG. 4 is a set of schematic views showing an example of an electromagnetic field control plate which is mounted in the cellular phone shown in FIG. 1.
Figure 5:
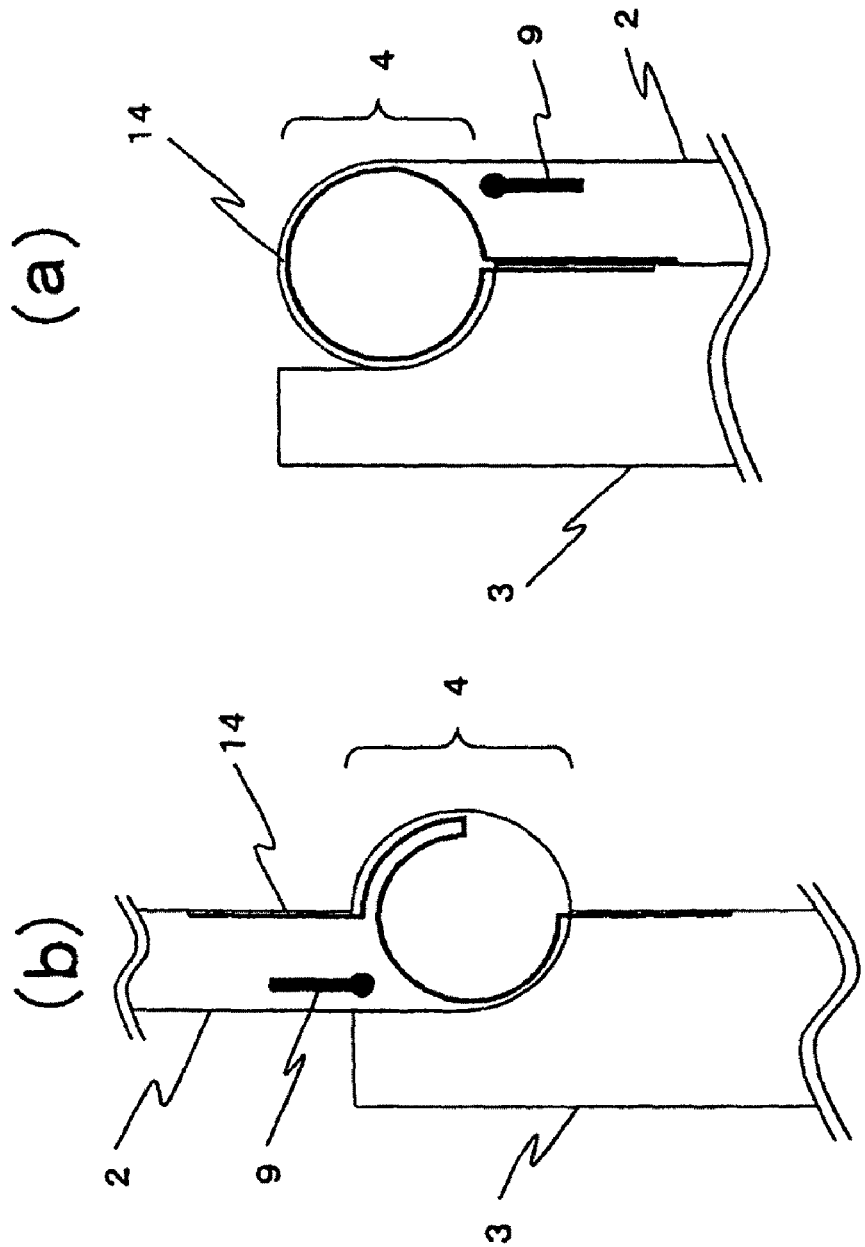
FIG. 5 is a set of schematic views showing another example of an electromagnetic field control plate which is mounted in the cellular phone shown in FIG. 1.
Figure 6:
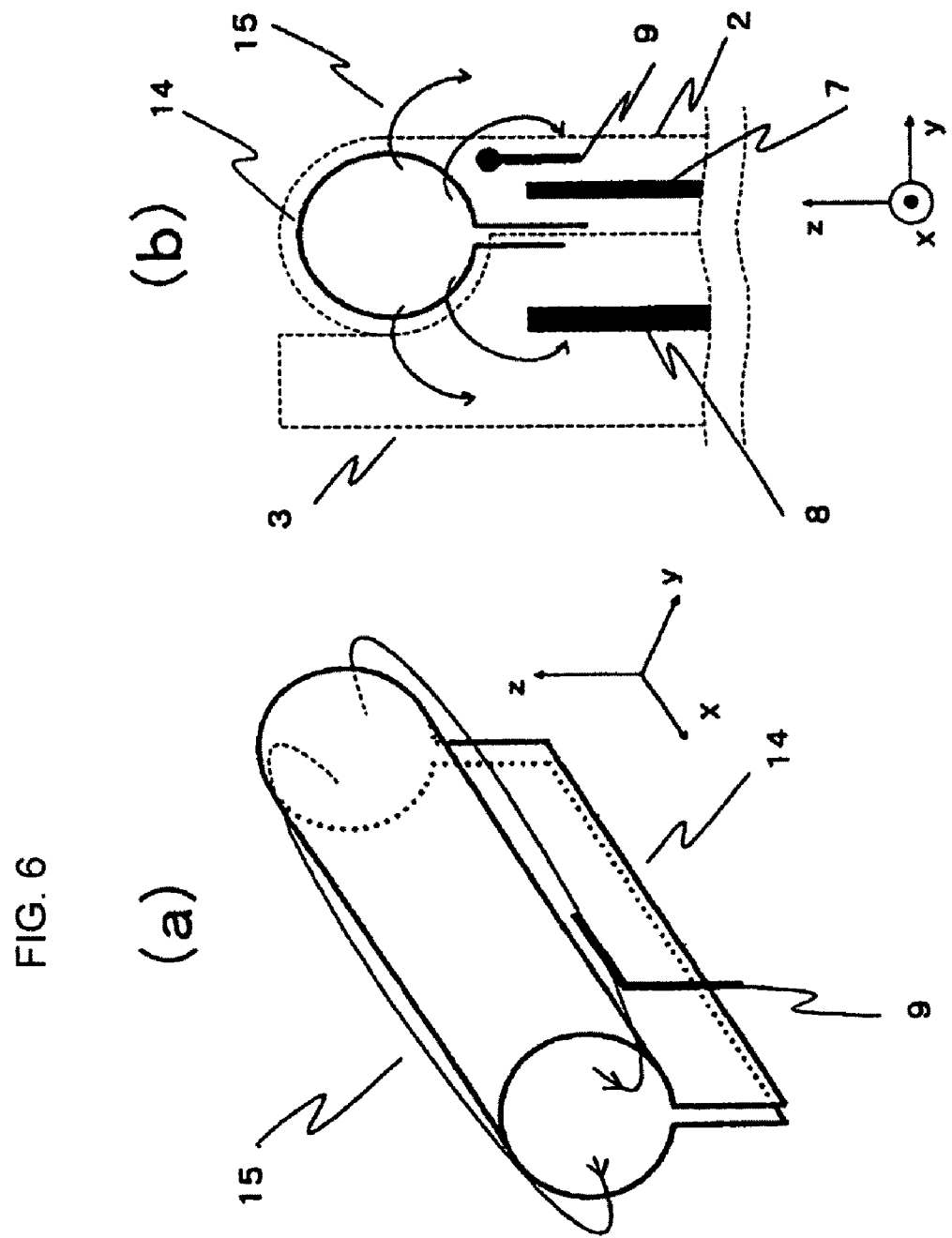
FIG. 6 is a set of schematic views showing the behavior of a magnetic field generated from the electromagnetic field control plate shown in FIG. 5.
Figure 7:
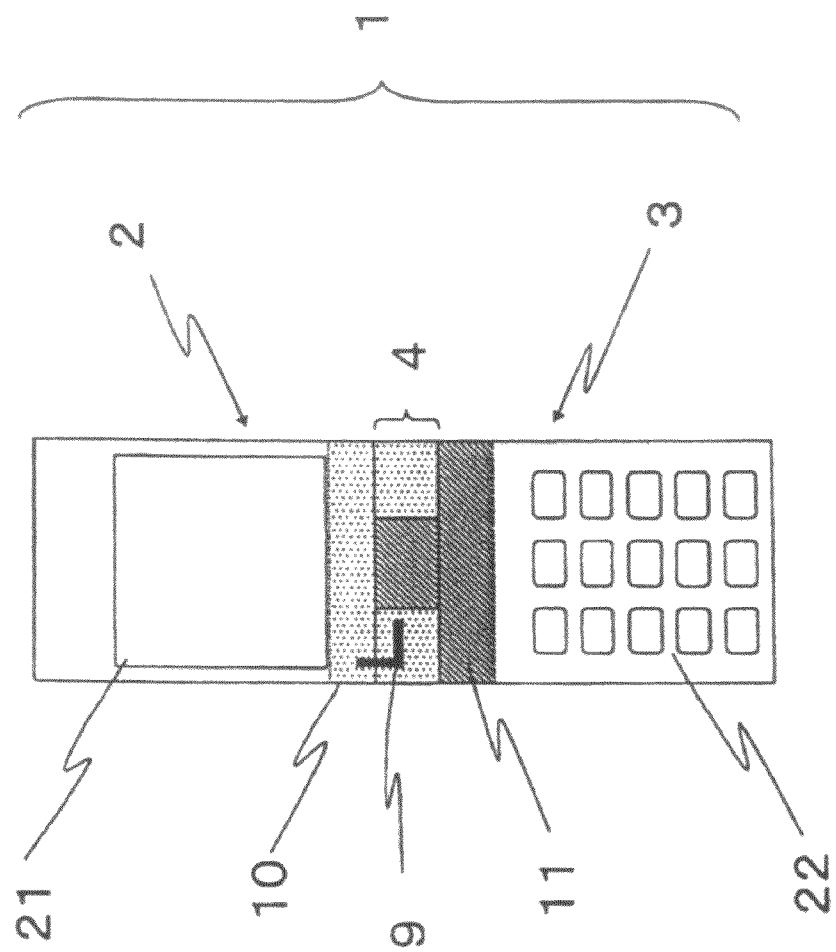
FIG. 7 is a schematic front elevational view of a cellular phone according to exemplary embodiment 1.
Figure 8:
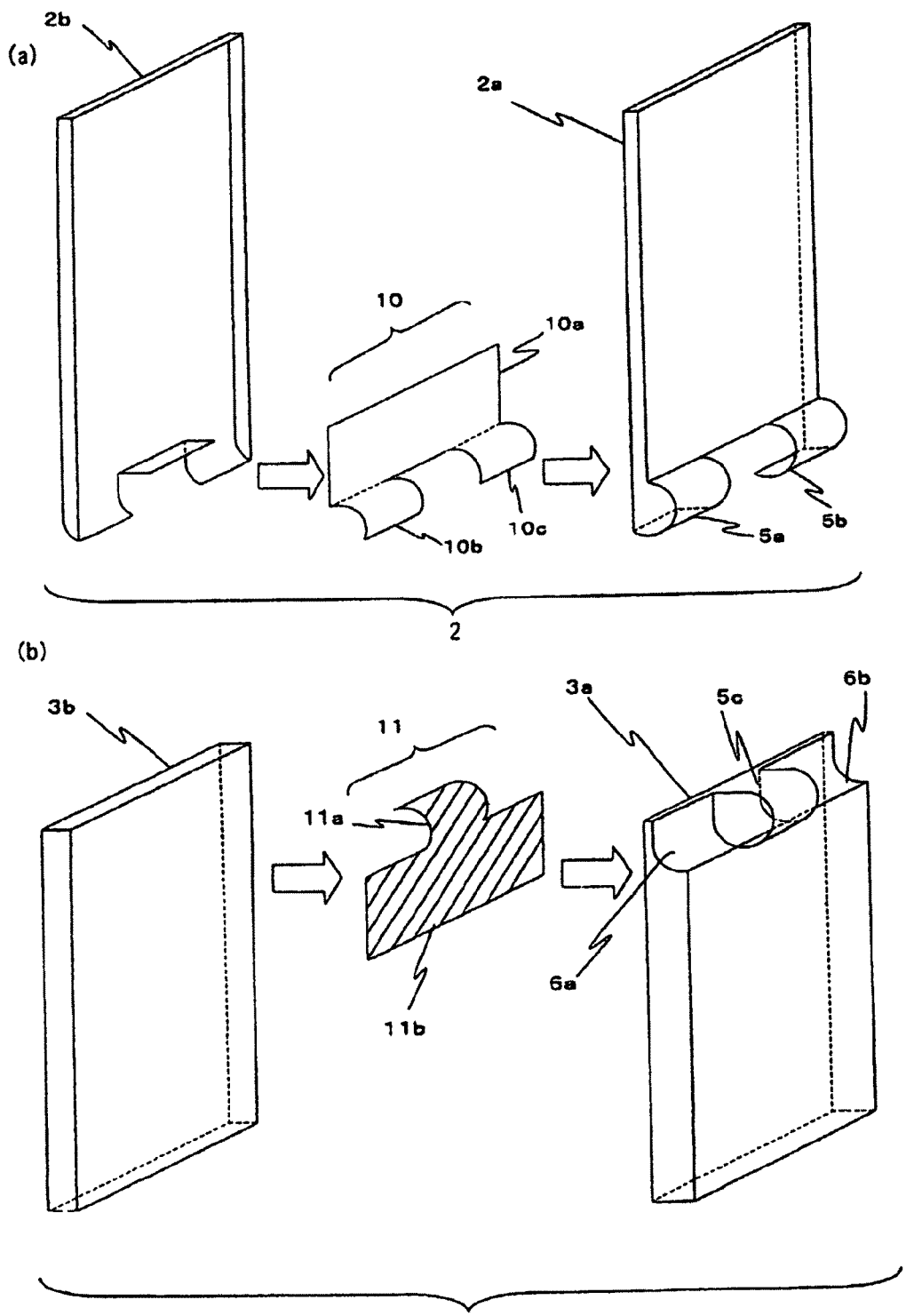
FIG. 8(a) is a schematic exploded perspective view of an upper casing shown in FIG. 7.
FIG. 8(b) is a schematic exploded perspective view of a lower casing shown in FIG. 7.
Figure 9:
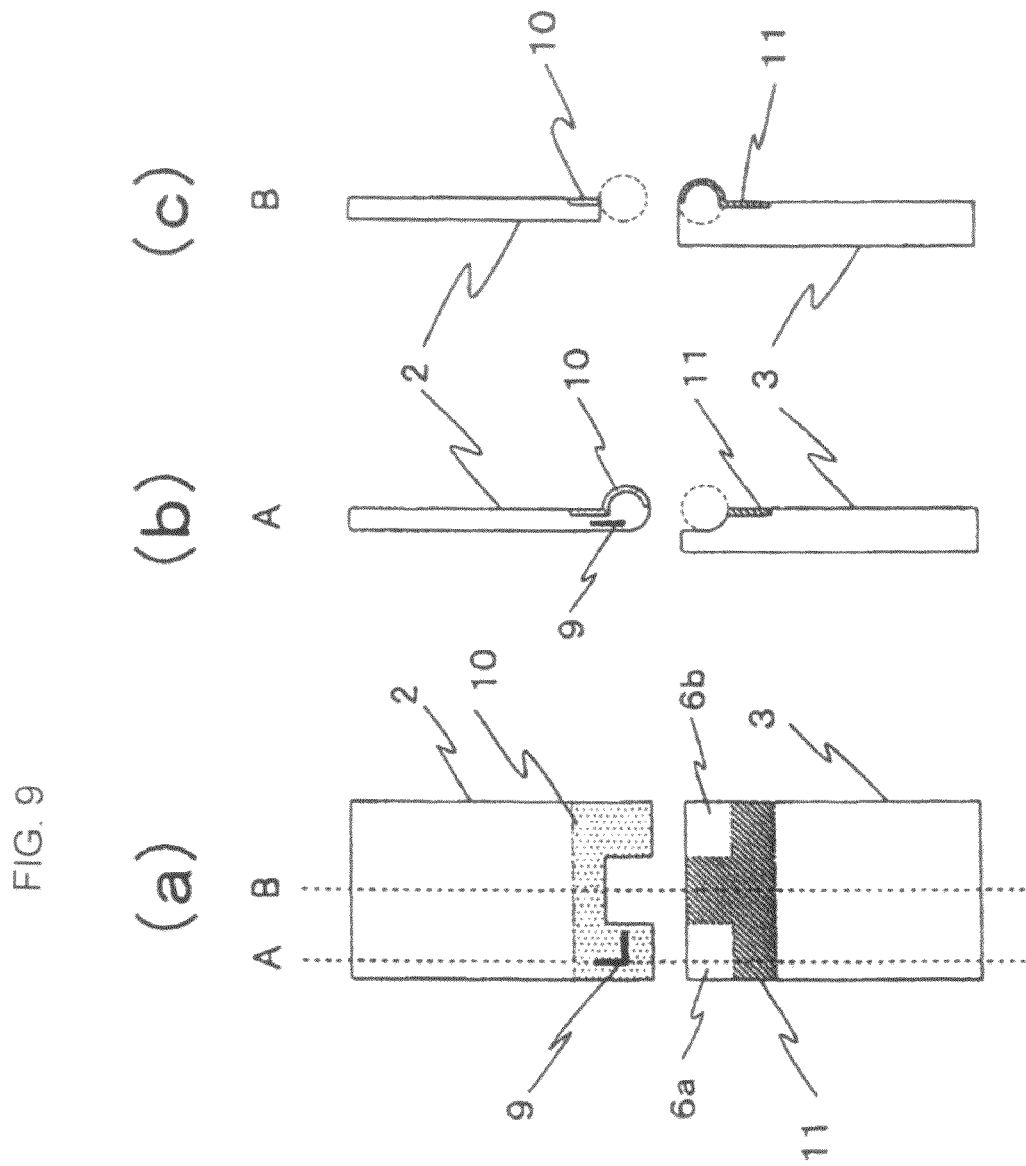
FIG. 9 is a set of schematic views showing the upper casing and the lower casing which are separate from each other, FIG. 9(a) being a front elevational view and FIGS. 9(b) and 9(c) being side elevational views.

A cellular phone according to an exemplary embodiment of the present invention will be described in detail below with reference to the drawings. FIG. 7 is a schematic front elevational view of cellular phone 1 according to the present exemplary embodiment. Cellular phone 1 comprises a first casing (upper casing 2) and a second casing (lower casing 3) which are openably and closably coupled to each other by hinge assembly 4. FIG. 8(a) is an exploded perspective view showing the basic structure of upper casing 2, and FIG. 8(b) is an exploded perspective view showing the basic structure of lower casing 3. FIG. 9 shows upper casing 2 and lower casing 3 which are separate from each other for illustrative purposes. In the description which follows, the upper casing and the lower casing may also collectively be referred to as "upper and lower casings". FIG. 9(a) is a front elevational view showing front surfaces of upper and lower casings 2, 3. FIG. 9(b) is a cross-sectional view taken along line A-A of FIG. 9(a), and FIG. 9(c) is a cross-sectional view taken along line B-B of FIG. 9(a). Break line A-A shown in FIG. 9(a) represents a straight line passing through antenna 9, and break line B-B a straight light passing through a transverse center of upper and lower casings 2, 3.

As shown in FIG. 7, LCD panel 21 serving as a display means and key pad 22 serving as an operating means are disposed on the front surface of cellular phone 1. More specifically, LCD panel 21, a speaker, not shown, etc. are disposed on the front surface of upper casing 2. Key pad 22, a microphone, not shown, etc. are disposed on the front surface of lower casing 3. A CCD camera, etc. may be disposed on the front surface or rear surface of upper and lower casings 2, 3. In figures other than FIG. 7, LCD panel 21, key pad 22, etc. are omitted from illustration.

As shown in FIGS. 8(a) and 8(b), upper casing 2 and lower casing 3 are made of a resin material and have hollow box shapes, respectively. More specifically, upper casing 2 comprises front casing 2a which provides the front surface and rear casing 2b which is held in abutment against front casing 2a and provides the rear surface. Similarly, lower casing 3 comprises front casing 3a which provides the front surface and rear casing 3b which is held in abutment against front casing 3a and which provides the rear surface.

As shown in FIG. 8(a), upper casing 2 (front casing 2a) has on its lower end half hinges 5a, 5b which have substantially semicylindrical shapes respectively, disposed at left and right ends thereof. As shown in FIG. 8(b), lower casing 3 has on its upper end half hinge 5c which has a substantially semicylindrical shape, disposed at its center, and indented surfaces 6a, 6b on both opposite outer sides of half hinge 5c. Antenna 9 is disposed in half hinge 5a of upper casing 2 (see FIG. 7).

Cellular phone 1 according to the present exemplary embodiment includes first control plate 10 disposed in upper casing 2 and second control plate 11 disposed in lower casing 3. First control plate 10 corresponds to a first reflective member according to the present invention. Second control plate 11 corresponds to a second reflective member according to the present invention. First control plate 10 will be described in detail below mainly with reference to FIG. 8(a), and second control plate 11 will be described in detail below mainly with reference to FIG. 8(b).

First control plate 10 has a shape corresponding to a mount surface therefor. Specifically, first control plate 10 has curved portions 10b, 10c complementary in shape to inner wall surfaces of half hinges 5a, 5b of upper casing 2 and flat portion 10a complementary in shape to an inner wall surface of upper casing 2 directly below the LCD panel. Stated otherwise, first control plate 10 is mounted on the flat inner wall surface directly below the LCD panel and the curved inner wall surfaces of half hinges 5a, 5b that are contiguous to the flat inner wall surface.

Second control plate 11 also has a shape corresponding to a mount surface therefor. Specifically, second control plate 11 has curved portion 11a complementary in shape to an inner wall surface of half hinge 5c of lower casing 3 and flat portion 11b complementary in shape to an inner wall surface of lower casing 3 directly below half hinge 5c. Stated otherwise, second control plate 11 is mounted on the curved inner wall surface of half hinge 5c and the flat inner wall surface that is contiguous to the curved inner wall surface.

First control plate 10 and second control plate 11 are not connected to the ground of circuit boards, not shown, disposed in upper and lower casings 2, 3, i.e., are kept out of contact with the ground of circuit boards front the standpoint of a DC.

As shown in FIGS. 9(a) and 9(b), the inner wall surfaces of upper and lower casings 2, 3 on which first control plate 10 and second control plate 11 are mounted are inner wall surfaces near the front surfaces. In other words, these inner wall surfaces face the human body while a call is being made. During the call, first control plate 10 and second control plate 11 are interposed between antenna 9 and the human body, not shown. Therefore, a portion of electromagnetic waves radiated from antenna 9 is reflected (shielded) by first control plate 10 and second control plate 11. For reflecting a portion of electromagnetic waves radiated from antenna 9 by first control plate 10 and second control plate 11 thereby to reduce the absorption by the human body of the electromagnetic waves, first control plate 10 and second control plate 11 should preferably be disposed in a position facing antenna 9 (see FIG. 9(b)). Furthermore, first control plate 10 and second control plate 11 should preferably cover a relatively wide area including the area in which antenna 9 is installed. This is because, if first control plate 10 and second control plate 11 which are disposed in a position facing antenna 9 cover a smaller area, then more electromagnetic waves tend to be diffracted back from around the edges of first control plate 10 and second control plate 11, resulting in a reduction in reflection efficiency. The term "relatively wide area" refers to a relative concept, and the actual covered area is determined based on various tests.

Figure 11:
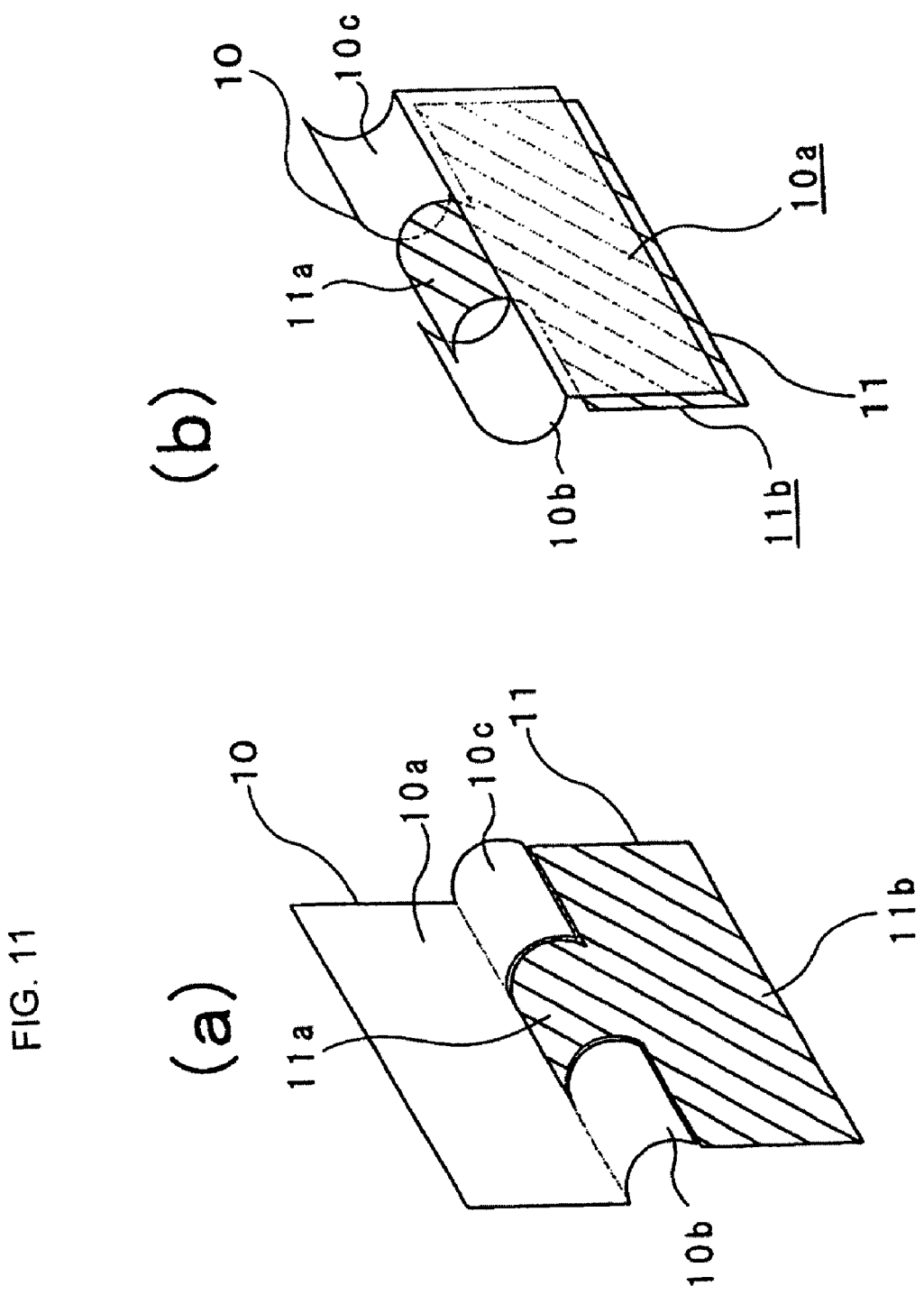
FIG. 11(a) is a perspective view of a first control plate and a second control plate when the cellular phone is unfolded.
FIG. 11(b) is an enlarged perspective view of the first control plate and the second control plate when the cellular phone is folded.

FIG. 10 is a set of views showing different cross sections of cellular phone 1 according to the present exemplary embodiment when it is unfolded and folded. Specifically, FIG. 10(a)

is a cross-sectional view taken along line A-A of FIG. 9(a), and FIG. 10(b) is a cross-sectional view taken along line B-B of FIG. 9(a). FIG. 11(a) is a view showing only first control plate 10 and second control plate 11 when the cellular phone is unfolded, and FIG. 11(b) is a view showing only first control plate 10 and second control plate 11 when the cellular phone is folded.

As shown in FIG. 10, when cellular phone 1 is in the unfolded state, first control plate 10 and second control plate 11 have a maximum projected area on the inner wall surfaces of upper and lower casings 2, 3 near their front surfaces. First control plate 10 and second control plate 11 also function as a substantially single continuous electromagnetic field control plate for the electromagnetic waves radiated from antenna 9. Specifically, as shown in FIG. 10(a), when cellular phone 1 is in the unfolded state, first control plate 10 and second control plate 11 are continuously disposed in an area over the inner wall surface of upper casing 2 directly below the LCD panel, the inner wall surface of the hinge assembly, and the inner wall surface of lower casing 3 directly above the key pad. Stated otherwise, first control plate 10 and second control plate 11 which are independent of each other are substantially combined integrally with each other and function as a substantially single electromagnetic field control plate for an electromagnetic field that is created by the electromagnetic waves radiated from antenna 9.

As described above, when cellular phone 1 is in the unfolded state, the reflection efficiency of first control plate 10 and second control plate 11 is maximized for the electromagnetic waves radiated from antenna 9. As a result, electromagnetic waves that are applied to the human body are reduced for improved call performance.

As shown in FIG. 11(a), a gap (of about several mm) corresponding to the thickness of upper and lower casings 2, 3 is present between first control plate 10 and second control plate 11. However, the gap is negligible as it is sufficiently small compared with the frequencies (800 MHz through several GHz) of the electromagnetic waves radiated from antenna 9. Therefore, any adverse effects that a leakage of electromagnetic waves through the gap has on the characteristics are almost nil, and the electromagnetic field is reduced in an area behind first control plate 10 and second control plate 11.

When cellular phone 1 is in the folded state, first control plate 10 and second control plate 11 are no longer substantially combined integrally with each other, but most of flat portions 10a, 11b of control plates 10, 11 overlap each other. As a result, the projected area of first control plate 10 and second control plate 11 on the inner wall surfaces of upper and lower casings 2, 3 near their front surfaces is smaller than when cellular phone 1 is in the unfolded state. According to the background art, when the cellular phone is folded, the electromagnetic field control plate is shaped as a loop and acts as an inductor, which is unnecessarily electromagnetically coupled to the antenna. According to the present exemplary embodiment, when the cellular phone is folded, first control plate 10 and second control plate 11 which function as a substantially single electromagnetic field control plate when the cellular phone is unfolded are separated into two independent control plates, and the projected area thereof is reduced. Therefore, adverse effects that the electromagnetic coupling has on the antenna characteristics are lessened.

The results of an experiment conducted to confirm the improved radiation efficiency during the call, using a prototype model of cellular phone 1 according to the present exemplary embodiment, will be described below.

The prototype model had an upper casing and a lower casing made of a resin (nonmetal). Each first control plate and each second control plate comprised a multilayer sheet in the form of a stack of a pliable metallic sheet and a magnetic sheet. The first control plate and the second control plate were mounted respectively in the upper and lower casings with the magnetic sheets facing an antenna. An area covered by the first control plate and the second control plate was an optimum area determined based on the results of an experiment conducted on a comparative model that was free of an electromagnetic field control plate. Specifically, the speaker of the comparative model was held against an ear of a quasi-human (the phantom) to reproduce a general call state, and an area corresponding to an area wherein the amount of electric power (lost electric power) absorbed by a surface layer of the phantom at this time was used as an optimum area.

For accurately evaluating the actual communication performance, the phantom that was used had values close to the specific permittivity and conductivity of human tissue.

The radiated electric power (Pr) during the call was measured while the speaker of the comparative model was being held against the ear of the phantom. As a result, it was confirmed that the radiated electric power of the prototype model was 0.7 dB improved over the radiated electric power of the comparative model.

The improvement of the radiation efficiency ($\eta$) is related to the lost electric power (Ploss) caused by the human body. Therefore, the lost electric power at a minute area on the surface layer of the phantom was measured. As a result, it was confirmed that the lost electric power of the prototype model was reduced to about one-half (51.8%) of the lost electric power of the comparative model.

The above experimental results indicate that the electromagnetic wave reflecting effect of the first control plate and the second control plate reduces the electromagnetic field on the side of the control plates which is remote from the antenna (behind the control plates), so that the absorption by the phantom of the electric power is reduced. In other words, the experimental results indicate that the first control plate and the second control plate are effective to improve call performance.

Since the upper and lower casings of the prototype model are made of nonmetal, they have a small specific permittivity. Therefore, the electromagnetic field (mainly magnetic field) generated by the electromagnetic waves output from the antenna is almost not affected by the upper and lower casings, but may be considered to pass through the upper and lower casings. Accordingly, the improvement of the call performance can be said to be caused by the effect of the first control plate and the second control plate.

According to the present invention, as described above, while the adverse effect of the electromagnetic coupling at the time the cellular phone is in the standby mode (the cellular phone is folded) is reduced, and the electric power loss due to the absorption by the human body of the electric power during the call (at the time the cellular phone is unfolded) is reduced for increased call performance.

Exemplary Embodiment 2

A cellular phone according to another exemplary embodiment of the present invention will be described below. The cellular phone according to the present exemplary embodiment has basic structure that is identical to the cellular phone according to exemplary embodiment 1. Therefore, identical structural details will not be described below.

FIG. 12(a) is an exploded perspective view of upper casing 2 of the cellular phone according to the present exemplary embodiment, and FIG. 12(b) is an exploded perspective view of lower casing 3 thereof. FIG. 13(a) shows a first control plate disposed in upper casing 2, and FIG. 13(b) shows a second control plate disposed in lower casing 2. First control plate 10 corresponds to a first reflective member according to the present invention. Second control plate 11 corresponds to a second reflective member according to the present invention. In these figures and figures to be referred to below which show upper and lower casings 2, 3, the LCD panel and the key pad are omitted from illustration.

Half hinges 5a, 5b (FIG. 12(a)) of upper casing 2 of the cellular phone according to the present exemplary embodiment are higher than half hinges 5a, 5b shown in FIG. 8(a), and have a shape projecting greatly to the front surface. Therefore, the distance between the surface of the LCD panel and the vertexes of half hinges 5a, 5b is greater than the corresponding distance in upper casing 2 according to exemplary embodiment 1. In addition, the space between half hinges 5a, 5b is wider. Accordingly, the leakage of electromagnetic waves through the space between half hinges 5a, 5b is not negligible. For this reason, a third reflective member for closing the above space is added to first control plate 10 that is mounted in upper casing 2. Details of the third reflective member will be described later.

As shown in FIG. 12(b), half hinge 5c of lower casing 3 is disposed on the upper end of lower casing 3. As shown in FIG. 8(b), half hinge 5c of lower casing 3 according to exemplary embodiment 1 is disposed on the front surface of lower casing 3. The front surface of lower casing 3 according to exemplary embodiment 1 also has indented surfaces 6a, 6b on which half hinges 5a, 5b (FIG. 8(a)) of upper casing 2 are placed. According to the present exemplary embodiment, however, upper casing 2 nor lower casings 3 have indented surfaces corresponding to indented surfaces 6a, 6b respectively. The mounted surface of second control plate 11 (FIG. 13) of lower casing 3 according to the present exemplary embodiment is not much different from the mounted surface of second control plate 11 of lower casing 3 according to exemplary embodiment 1. Therefore, there is not much difference between the shape of second control plate 11 according to the present exemplary embodiment and the shape of second control plate 11 according to exemplary embodiment 1.

Figure 14:
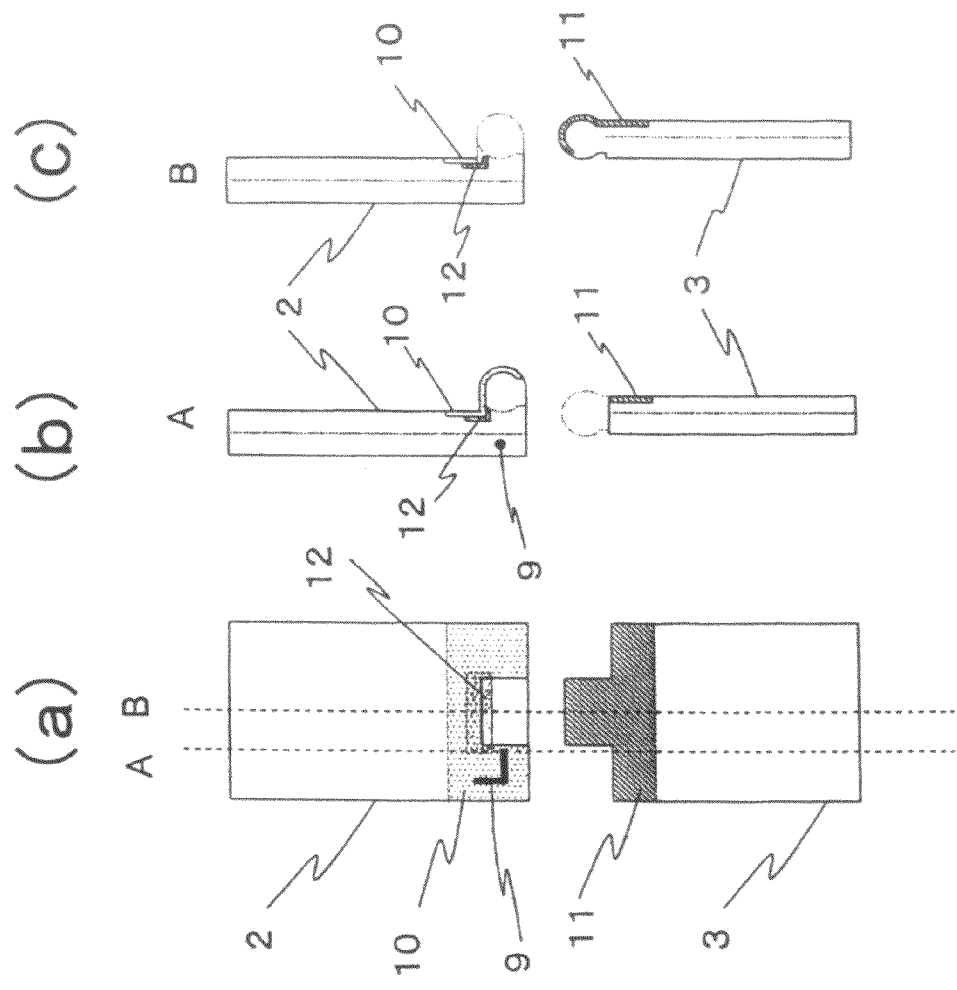
FIG. 14 is a set of schematic views showing the upper casing and the lower casing which are separate from each other, FIG. 14(a) being a front elevational view and FIGS. 14(b) and 14(c) being side elevational views.

In FIG. 14, upper casing 2 and lower casing 3 are shown as separate from each other for illustrative purposes. FIG. 14(a) is a front elevational view showing the front surface of upper casing 2 and lower casing 3, FIG. 14(b) is a cross-sectional view taken along line A-A of FIG. 14(a), and FIG. 14(c) is a cross-sectional view taken along line B-B of FIG. 14(a). Break line A-A shown in FIG. 14(a) represents a straight line passing through antenna 9, and break line B-B a straight light passing through a transverse center of upper and lower casings 2, 3.

Figure 13:
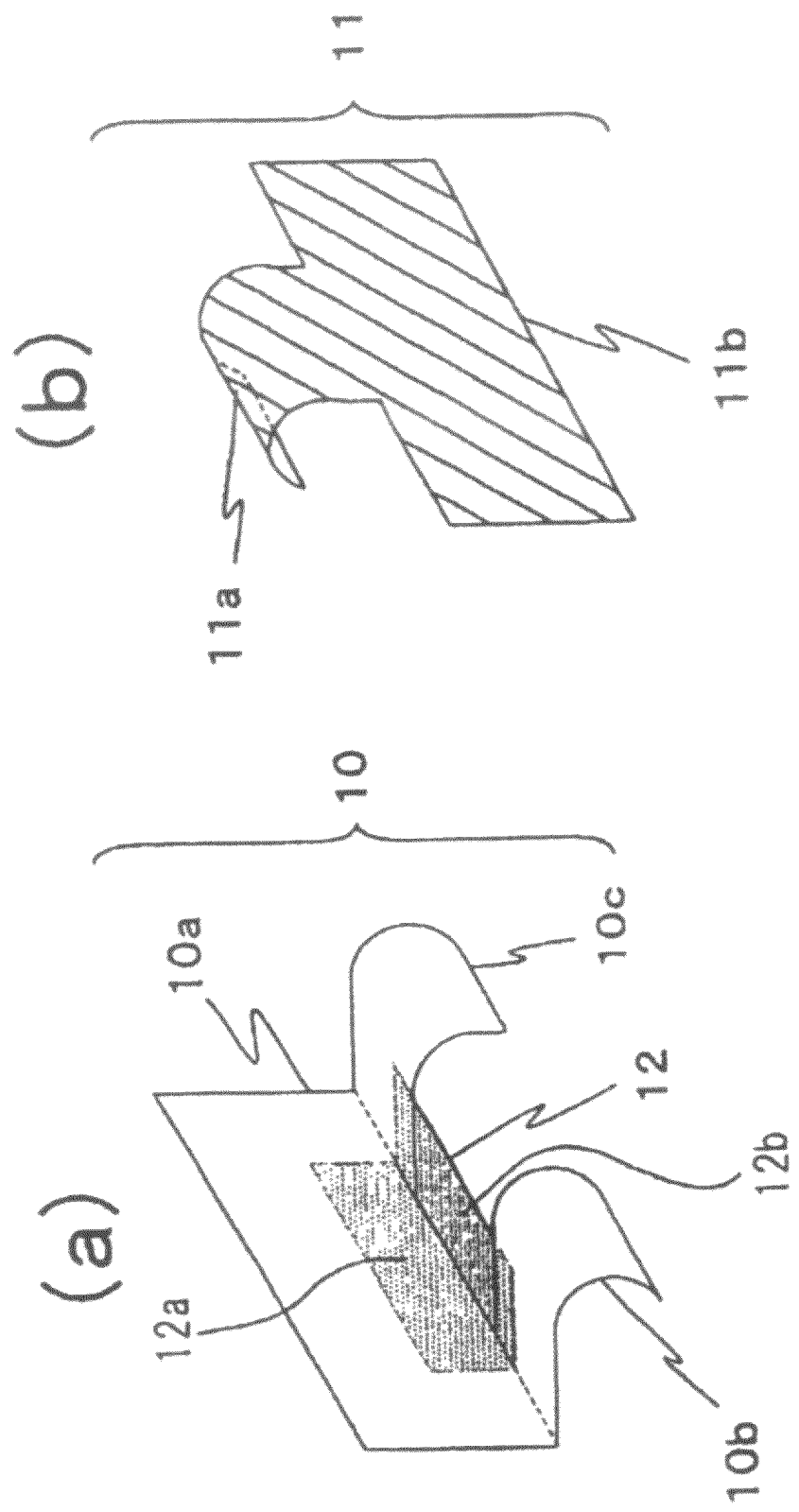
FIG. 13(a) is an enlarged perspective view of a first control plate mounted in the upper casing shown in FIG. 12.
FIG. 13(b) is an enlarged perspective view of a second control plate mounted in the lower casing shown in FIG. 12.

As shown in FIGS. 13 and 14, third reflective member (auxiliary control plate 12) is disposed centrally in a lower portion of upper casing 3. Auxiliary control plate 12 shares common structural details with first control plate 10 and second control plate 11, except its shape. As shown in FIG. 13(a), auxiliary control plate 12 is bent through about 90° and has first surface 12a and second surface 12b which lie substantially perpendicularly to each other. First surface 12a of auxiliary control plate 12 is joined in its entirety to the reverse surface of flat portion 10a of first control plate 10a. Second surface 12b of auxiliary control plate 12 is joined partly to the reverse surfaces of curved portions 10b, 10c of first control plate 10. However, it is not an essential requirement for auxiliary control plate 12 and first control plate 10 to overlap each other as shown.

As shown in FIG. 14(c), curve portion 11a of second control plate 11 is greater in size than curve portion 11a (FIG. 11b) of second control plate 11 according to exemplary embodiment 1. Specifically, curve portion 11a of second control plate 11 has a greater arcuate length. Curve portion 11a is thus enlarged depending on the size of half hinge 5c of lower casing 3 in which curved portion 11a is mounted, and does not represent an essential variation (see FIGS. 14(c) and 9(c)).

Figure 16:
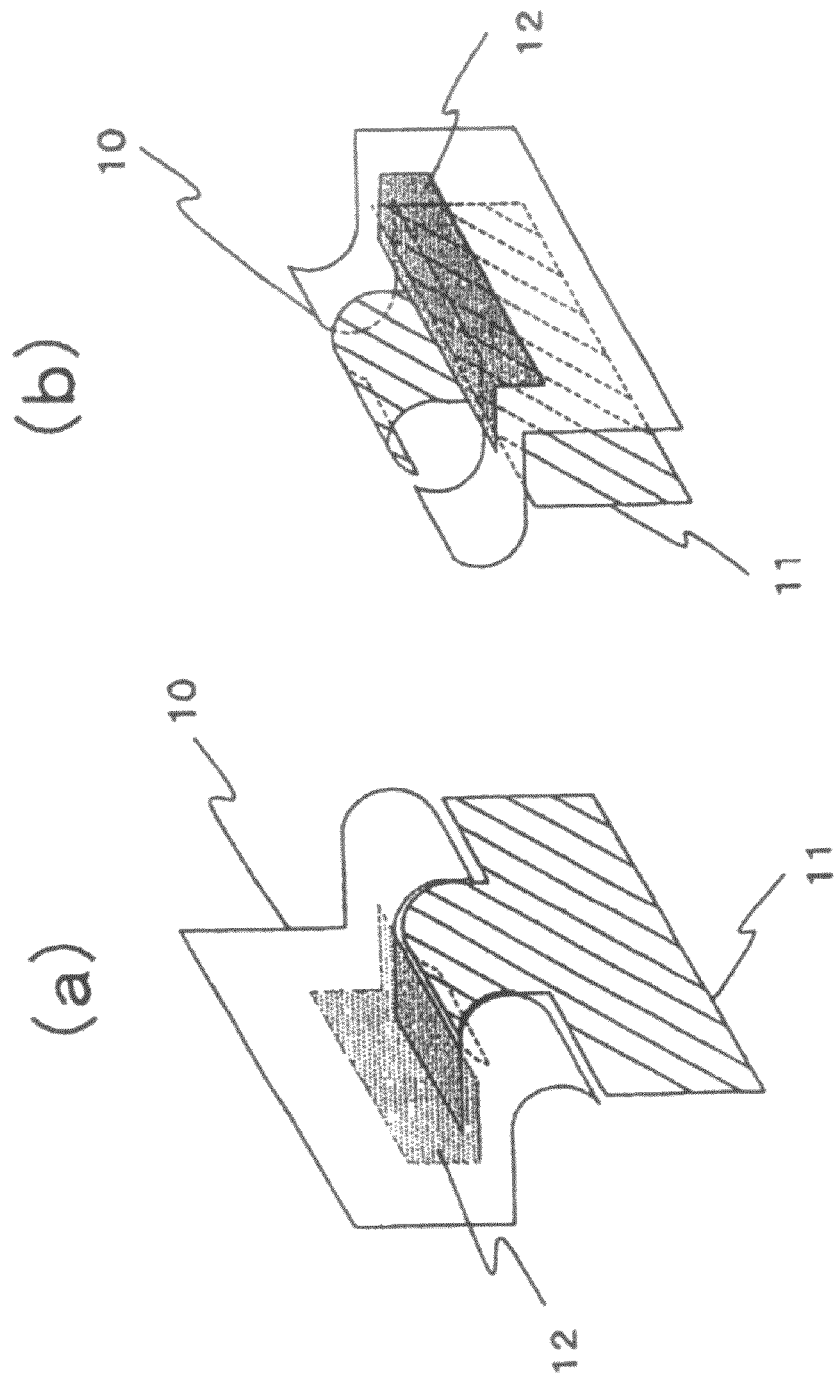
FIG. 16(a) is an enlarged perspective view of the first control plate, an auxiliary control plate, and the second control plate when the cellular phone is unfolded.
FIG. 16(b) is an enlarged perspective view of the first control plate, the auxiliary control plate, and the second control plate when the cellular phone is folded.

FIG. 15 shows different cross sections of the cellular phone according to the present exemplary embodiment when it is unfolded and folded. Specifically, FIG. 15(a) is a cross-sectional view taken along line A-A of FIG. 14, and FIG. 15(b) is a cross-sectional view taken along line B-B of FIG. 14. FIG. 16(a) is a view showing only first control plate 10 and second control plate 11 when the cellular phone is unfolded, and FIG. 16(b) is a view showing only first control plate 10 and second control plate 11 when the cellular phone is folded. As shown in these figures, when the cellular phone is unfolded, the space between half hinges 5a, 5b of upper casing 2 is covered with auxiliary control plate 12 (see FIG. 16(a)). When the cellular phone is unfolded, therefore, first control plate 10, auxiliary control plate 12, and second control plate 11 continuously cover an area over the inner wall surface of upper casing 2 directly beneath the LCD panel, the inner wall surface of the hinge assembly, the space between the half hinges, and the inner wall surface of lower casing 3 directly above the key pad. Stated otherwise, first control plate 10, auxiliary control plate 12, and second control plate 11 are substantially combined integrally with each other and function as a substantially single electromagnetic field control plate for an electromagnetic field that is created by the electromagnetic waves radiated from the antenna. At this time, first control plate 10, second control plate 11, and auxiliary control plate 12 have a maximum projected area on the inner wall surfaces of upper and lower casings 2, 3 near their rear surfaces (see FIG. 15). When the cellular phone is in the unfolded state, therefore, the reflection efficiency of the reflective members is maximized for the electromagnetic waves radiated from the antenna. As a result, electromagnetic waves that are applied to the human body are reduced for improved call performance.

On the other hand, when the cellular phone is folded, first control plate 10, auxiliary control plate 12, and second control plate 11 are no longer substantially combined integrally with each other, and the projected area of these control plates on the inner surfaces of upper and lower casings 2, 3 near their rear surfaces is reduced. Therefore, no current loop is developed when the cellular phone is folded.

The area of the second surface of auxiliary control plate 12 which is not joined to curved portions 10b, 10c of first control plate 10 is exposed out (see FIG. 16(a)). It is possible to place the entire surface of auxiliary control plate 12 within upper casing 2 by changing the shape of upper casing 2.

A modification of auxiliary control plate 12 will be described below. In exemplary embodiment 1, the gap between first control plate 10 of upper casing 2 and second control plate 11 of lower casing 3 is negligibly small when the cellular phone is unfolded. However, in some casing structures, the gap may be unnegligibly large. For example, upper casing 2 shown in FIG. 16(a) has a large space between half hinges 5a, 5b because half hinges 5a, 5b project greatly to the front surface, and auxiliary control plate 12 is placed over the space. According to the present modification, upper casing 2 has a wall extending into the space that is covered with auxiliary control plate 12, and auxiliary control plate 12 is mounted on an inner surface of the wall. In other words, auxiliary control plate 12 is disposed in its entirety within upper casing 2.

Figure 17:
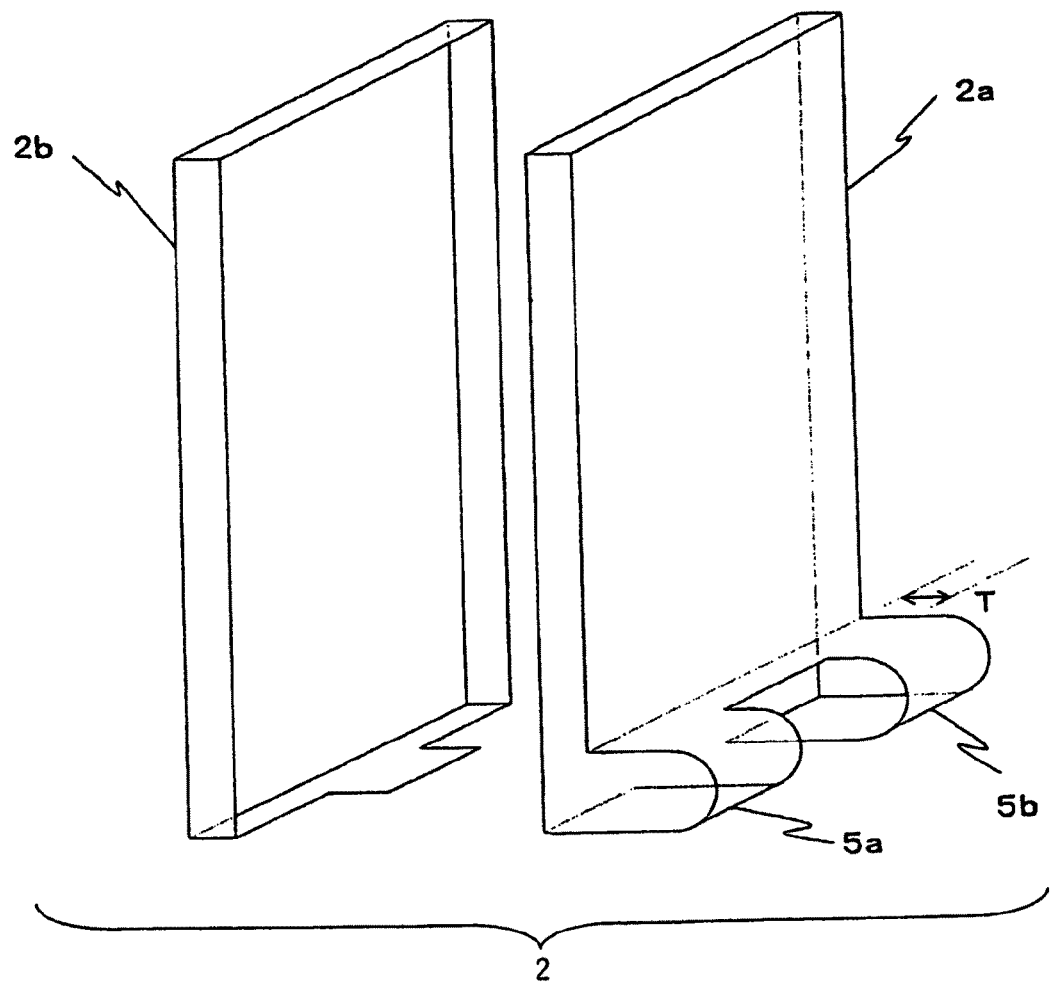
FIG. 17 is a schematic exploded perspective view of an upper casing according to a modification.

FIG. 17 is an exploded perspective view of upper casing 2 which incorporates auxiliary control plate 12. As shown in FIG. 17, upper casing 2 is basically identical in shape to upper casing 2 shown in FIG. 12(a). However, upper casing 2 has a wall (front surface) extending along the direction in which half hinges 5a, 5b project, by the distance (distance T in FIG. 17) over which half hinges 5a, 5b project to the front surface. The space referred to above is thus eliminated.

Figure 18:
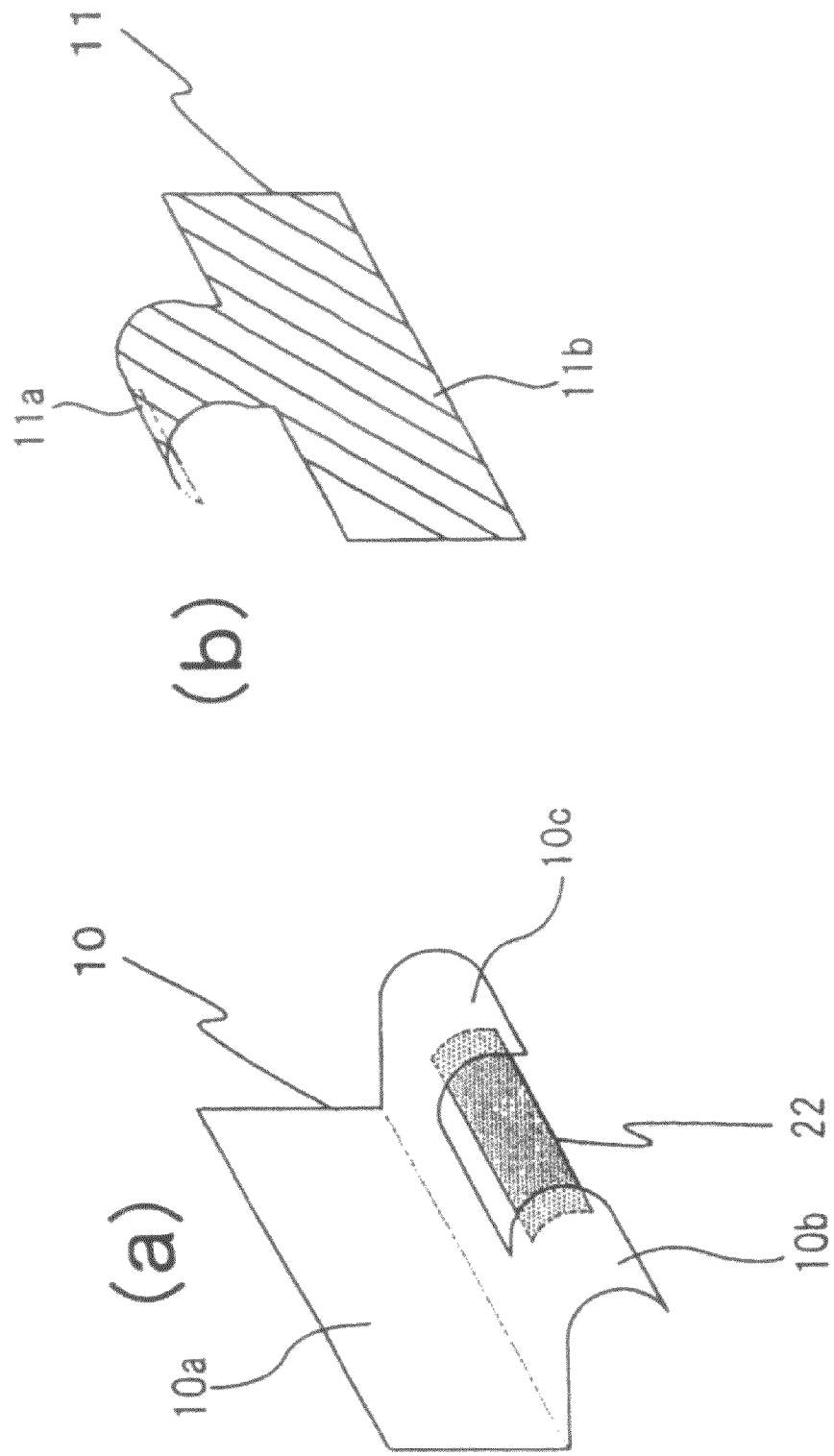
FIG. 18(a) is an enlarged perspective view of a first control plate and an auxiliary control plate which are adapted to the upper casing shown in FIG. 17.
FIG. 18(b) is an enlarged perspective view of a second control plate which is adapted to the upper casing shown in FIG. 17.

FIG. 18 shows only first control plate 10, second control plate 11, and auxiliary control plate 22. As shown in FIG. 18, auxiliary control plate 22 has longitudinally opposite ends joined respectively to curved portions 10a, 10b of first control plate 10.

Figure 19:
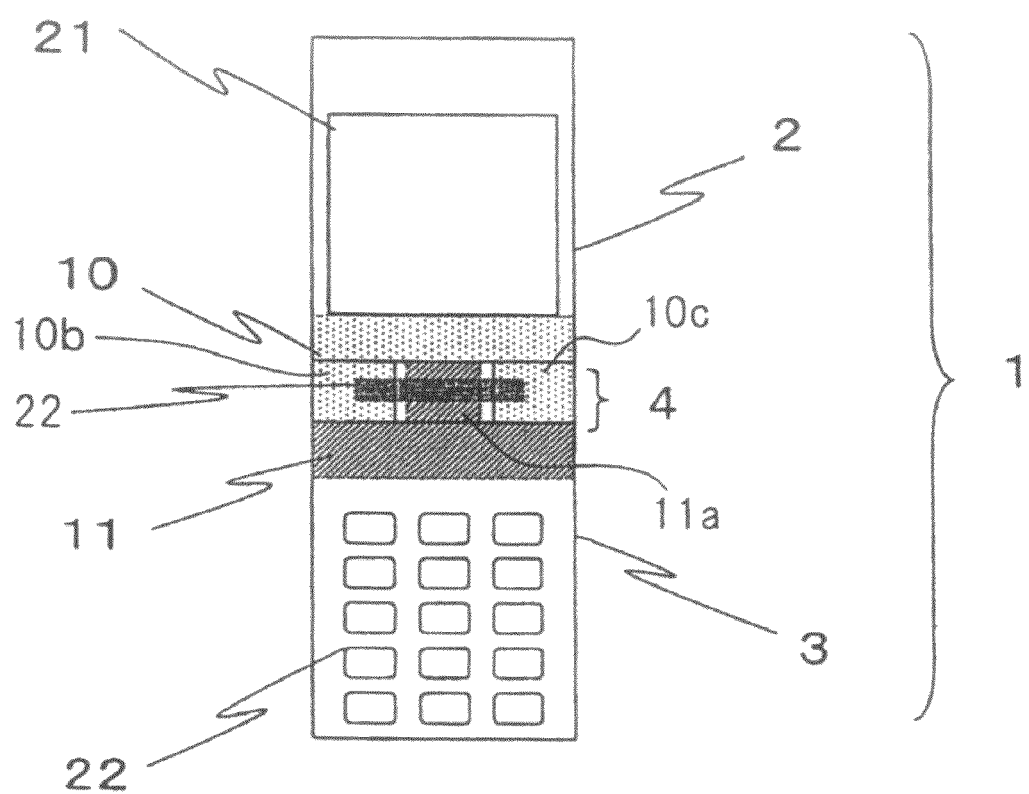
FIG. 19 is a schematic front elevational view of a cellular phone which includes the upper casing shown in FIG. 17.

FIG. 19 is a front elevational view of cellular phone 1 with auxiliary control plate 22 mounted therein. In lower casing 3 of cellular phone 1, second control plate 11 cannot be mounted on the half hinge fully thereacross for the reason that some parts, not shown, are installed on the ends of the half hinge. Accordingly, the width of curved portion 11a of second control plate 11 is smaller than the width of the half hinge. As a result, gaps are present between curved portion 11a of second control plate 11 and curved portions 10a, 10b of first control plate 10. These gaps are closed by auxiliary control plate 22. An antenna, which is omitted from illustration in FIG. 19, is disposed in a left side of the lower end portion of upper casing 2, as with exemplary embodiment 1.

As shown in FIG. 18(a), auxiliary control plate 22 is curved and has the same curvature as curved portions 10a, 10b of first control plate 10, and extends between curved portions 10a, 10b. Auxiliary control plate 22 has longitudinally opposite ends joined respectively to curved portions 10a, 10b of first control plate 10. When the cellular phone is unfolded, auxiliary control plate 22 is moved to a position where it covers the vertex of hinge assembly 4 (FIG. 19). Since the vertex of hinge assembly 4 is closest to the human body during the call, auxiliary control plate 22 which is disposed in the position covering the vertex of hinge assembly 4 is effective for reducing the electromagnetic field applied to the human body.

Figure 20:
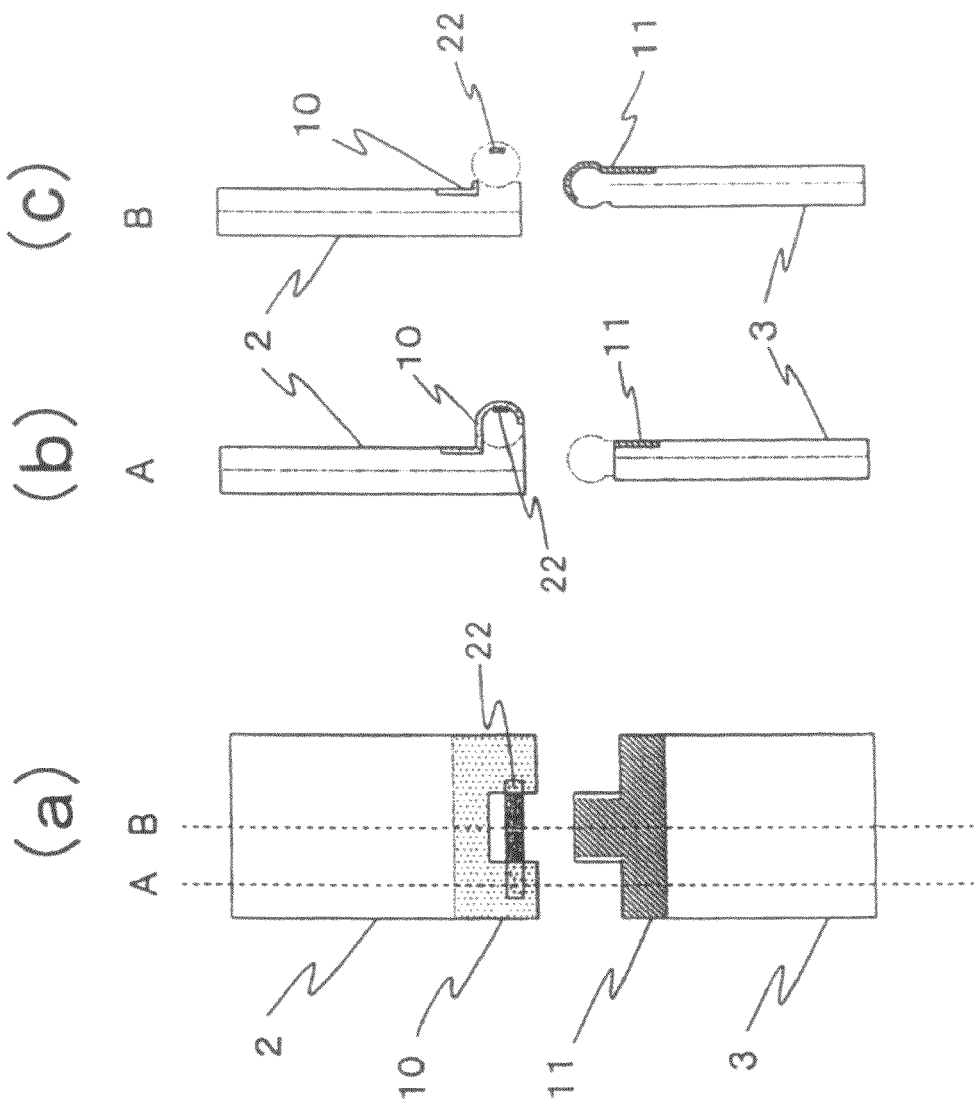
FIG. 20 is a set of schematic views showing an upper casing and a lower casing which are separate from each other, FIG. 20(a) being a front elevational view and FIGS. 20(b) and 20(c) being side elevational views.

In FIG. 20, upper casing 2 and lower casing 3 are shown as separate from each other for illustrative purposes. FIG. 20(a) is a front elevational view showing the front surface of upper casing 2 and lower casing 3, FIG. 20(b) is a cross-sectional view taken along line A-A of FIG. 20(a), and FIG. 20(c) is a cross-sectional view taken along line B-B of FIG. 20(a). Break line A-A shown in FIG. 20(a) represents a straight line passing through an antenna, not shown, and break line B-B a straight light passing through a transverse center of upper and lower casings 2, 3.

Figure 22:
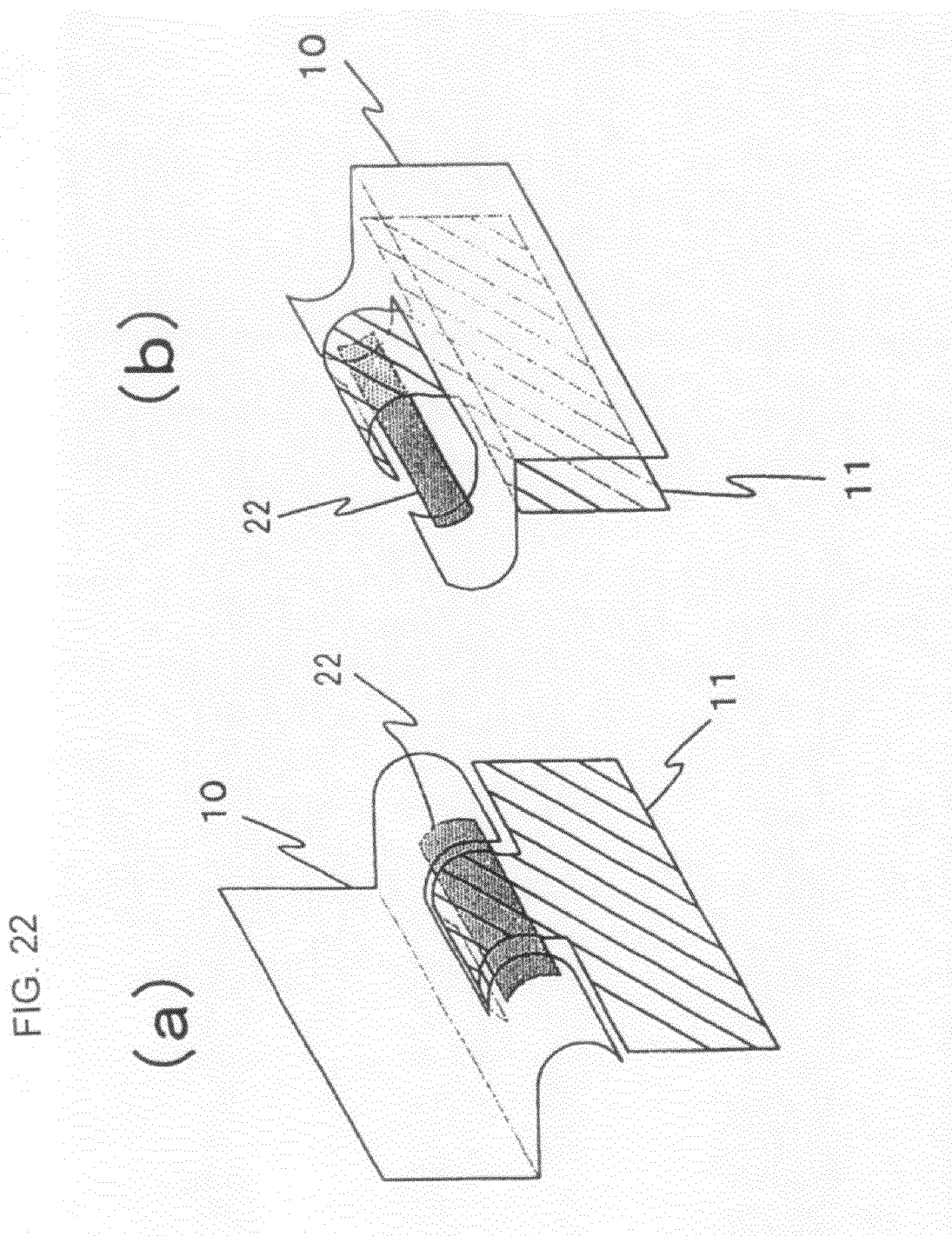
FIG. 22 is an enlarged perspective view of a first control plate, an auxiliary control plate, and a second control plate shown in FIG. 21 when the cellular phone is unfolded.

FIG. 21 shows different cross sections of the cellular phone according to the present exemplary embodiment when it is unfolded and folded. Specifically, FIG. 21(a) is a cross-sectional view taken along line A-A of FIG. 20, and FIG. 21(b) is a cross-sectional view taken along line B-B of FIG. 20. FIG. 22(a) is a view showing only first control plate 10, second control plate 11, and auxiliary control plate 22 when the cellular phone is unfolded, and FIG. 22(b) is a view showing only first control plate 10, second control plate 11, and auxiliary control plate 22 when the cellular phone is folded.

As shown in these figures, when the cellular phone is unfolded, control plates 10, 11, 22 mounted in upper and lower casings 2, 3 are substantially combined integrally with each other and function as a substantially single electromagnetic field control plate for the electromagnetic waves radiated from the antenna, not shown. When the cellular phone is unfolded, auxiliary control plate 22 goes under curved portion 11a of second control plate 11 and is held in contact with curved portion 11a. At this time, first control plate 10, second control plate 11, and auxiliary control plate 22 have a maximum projected area on the inner wall surfaces of upper and lower casings 2, 3 near their rear surfaces (see FIG. 21).

When the cellular phone is folded, first control plate 10, second control plate 11, and auxiliary control plate 12 are no longer substantially combined integrally with each other, and the projected area of these control plates 10, 11, 22 on the inner surfaces of upper and lower casings 2, 3 near their rear surfaces is reduced.

Exemplary Embodiment 3

A cellular phone according to still another exemplary embodiment of the present invention will be described below. FIG. 23(a) is an exploded perspective view of upper casing 2 of the cellular phone according to the present exemplary embodiment, and FIG. 23(b) is an exploded perspective view of lower casing 3 thereof.

As shown in FIGS. 23(a) and 23(b), half hinges 5a, 5b, 5c of upper casing 2 and lower casing 3 of the cellular phone according to the present exemplary embodiment are positionally inverted. Specifically, half hinge 5a is disposed centrally on the lower end of upper casing 2, and half hinges 5b, 5c are disposed respectively on left and right ends of the upper end of the lower casing.

Table 1 shows the casing structures according to the exemplary embodiments which are tabulated in relation to the half hinges. It can be understood from Table 1 that the casings of the cellular phone according to the present exemplary embodiment are different from those according to exemplary embodiment 1 with respect to not only the positions of the half hinges, but also other aspects.

Figure 23:
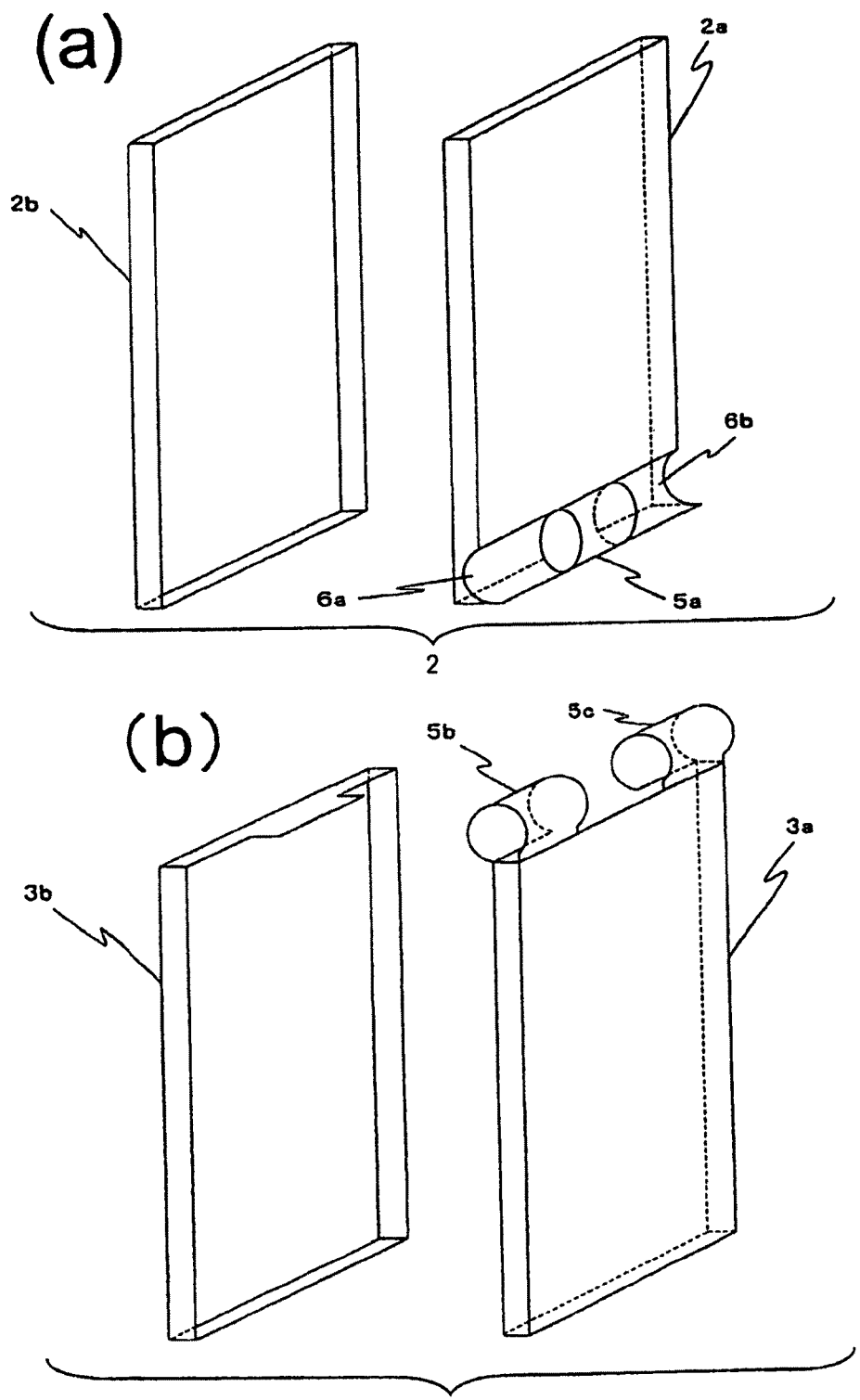
FIG. 23(a) is a schematic exploded perspective view of an upper casing of a cellular phone according to exemplary embodiment 3.
FIG. 23(b) is a schematic exploded perspective view of a lower casing thereof.

As shown in FIG. 23 and Table 1, half hinge 5a of upper casing 2 is disposed on the front surface. Upper casing 2 also has indented surfaces 6a, 6b on both opposite outer sides of half hinge 5a for placing thereon respective half hinges 5b, 5c of lower casing 3. Half hinges 5b, 5c of lower casing 3 are disposed on the upper end edge of lower casing 3.

TABLE 1

| | Casing | Surface on which half hinge is formed | Half hinge position | Surface shape on side of half hinge |
| --- | --- | --- | --- | --- |
| Exemplary embodiment 1 | Upper casing | Front surface | Left and right ends | Flat |
| | Lower casing | Front surface | Center | Indented |
| Exemplary embodiment 2 | Upper casing | Front surface | Left and right ends | Indented |
| | Lower casing | Upper end surface | Center | Flat |
| Exemplary embodiment 3 | Upper casing | Front surface | Center | Indented |
| | Lower casing | Upper end surface | Left and right ends | Flat |

Figure 24:
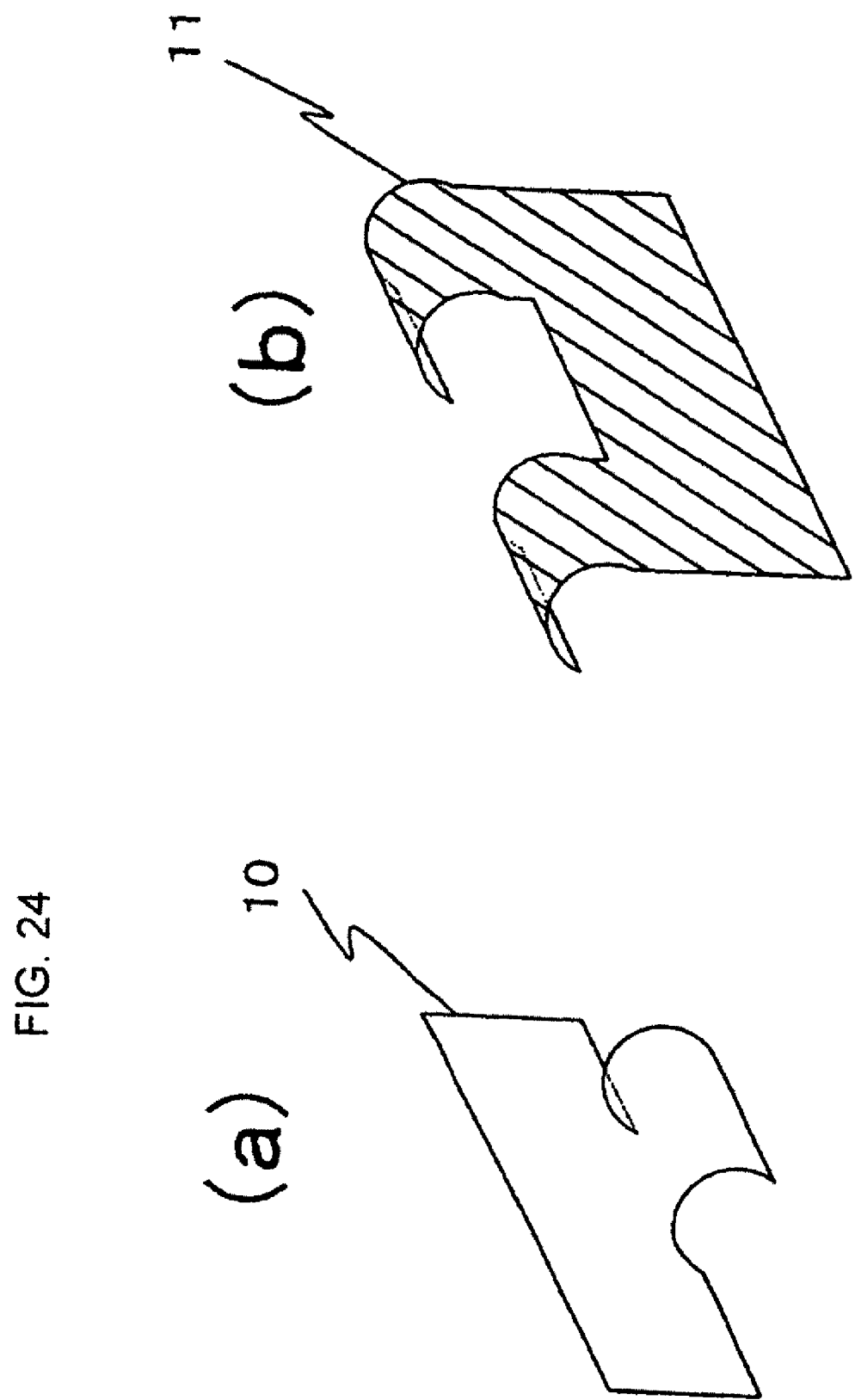
FIG. 24(a) is an enlarged perspective view of a first control plate mounted in the upper casing shown in FIG. 23.
FIG. 24(b) is an enlarged perspective view of a second control plate mounted in the lower casing shown in FIG. 23.
Figure 25:
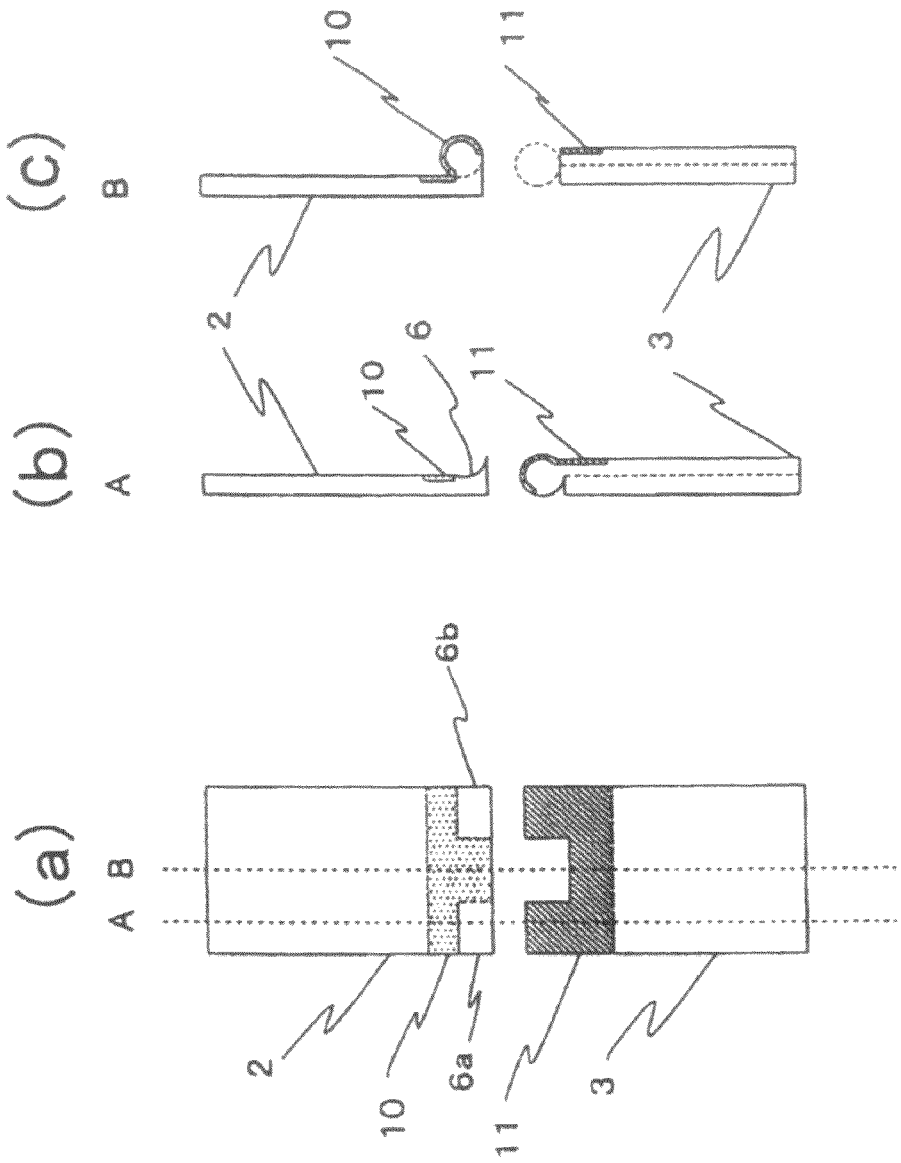
FIG. 25 is a set of schematic views showing the upper casing and the lower casing which are separate from each other, FIG. 25(a) being a front elevational view and FIGS. 25(b) and 25(c) being side elevational views.

FIG. 24(a) is a view showing only first control plate 10, and FIG. 24(b) is a view showing only second control plate 11. FIG. 25 shows upper casing 2 and lower casing 3 which are separate from each other for illustrative purposes. FIG. 25(a) is a front elevational view showing front surfaces of upper and lower casings 2, 3. FIG. 25(b) is a cross-sectional view taken along line A-A of FIG. 25(a), and FIG. 25(c) is a cross-sectional view taken along line B-B of FIG. 25(a). Break line A-A shown in FIG. 25(a) represents a straight line passing through an antenna, not shown, and break line B-B a straight light passing through a transverse center of upper and lower casings 2, 3.

Figure 27:
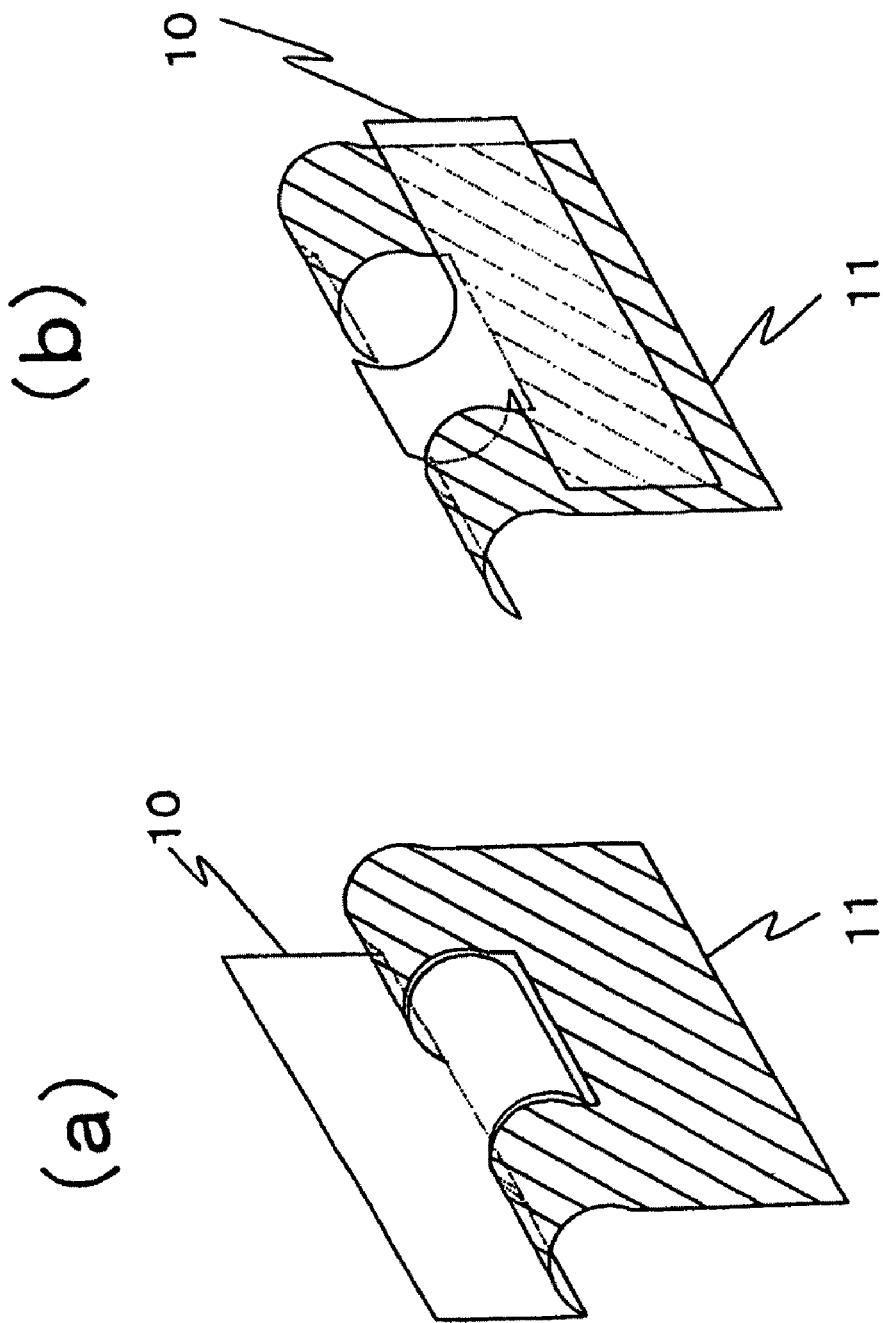
FIG. 27 is an enlarged perspective view of the first control plate and the second control plate shown in FIG. 26 when the cellular phone is unfolded.

FIG. 26 shows different cross sections of the cellular phone according to the present exemplary embodiment when it is unfolded and folded. Specifically, FIG. 26(a) is a cross-sectional view taken along line A-A of FIG. 25, and FIG. 26(b) is a cross-sectional view taken along line B-B of FIG. 25. FIG. 27(a) is a view showing only first control plate 10 and second control plate 11 when the cellular phone is unfolded, and FIG. 27(b) is a view showing only first control plate 10 and second control plate 11 when the cellular phone is folded. As shown in these figures, when the cellular phone is unfolded, first control plate 10 and second control plate 11 which are mounted in upper and lower casings 2, 3 are substantially combined integrally with each other and function as a substantially single electromagnetic field control plate for an electromagnetic field that is created by the electromagnetic waves radiated from the non-illustrated antenna. At this time, an area covered with first control plate 10 and second control plate 11 that are substantially combined integrally with each other is essentially the same as is the case with exemplary embodiment 1. When the cellular phone is unfolded, first control plate 10 and second control plate 11 have a maximum projected area on the inner wall surfaces of upper and lower casings 2, 3 near their rear surfaces (see FIG. 26). When the cellular phone is in the unfolded state, therefore, the reflection efficiency of the reflective members is maximized for the electromagnetic waves radiated from the antenna. As a result, electromagnetic waves that are applied to the human body are reduced for improved call performance.

On the other hand, when the cellular phone is folded, first control plate 10 and second control plate 11 are no longer substantially combined integrally with each other, and the projected area of control plates 10, 11 on the inner surfaces of upper and lower casings 2, 3 near their rear surfaces is reduced. Therefore, no current loop is developed when the cellular phone is folded.

Exemplary Embodiment 4

The exemplary embodiments of the present invention have been described above with respect to cellular phones whose upper casing and lower casing are openably and closably connected to each other. However, the present invention is also applicable to cellular phones having structures other than the above structures. For example, the present invention is also applicable to a cellular phone whose upper casing and lower casing are openably and closably and rotatably connected to each other.

Figure 28:
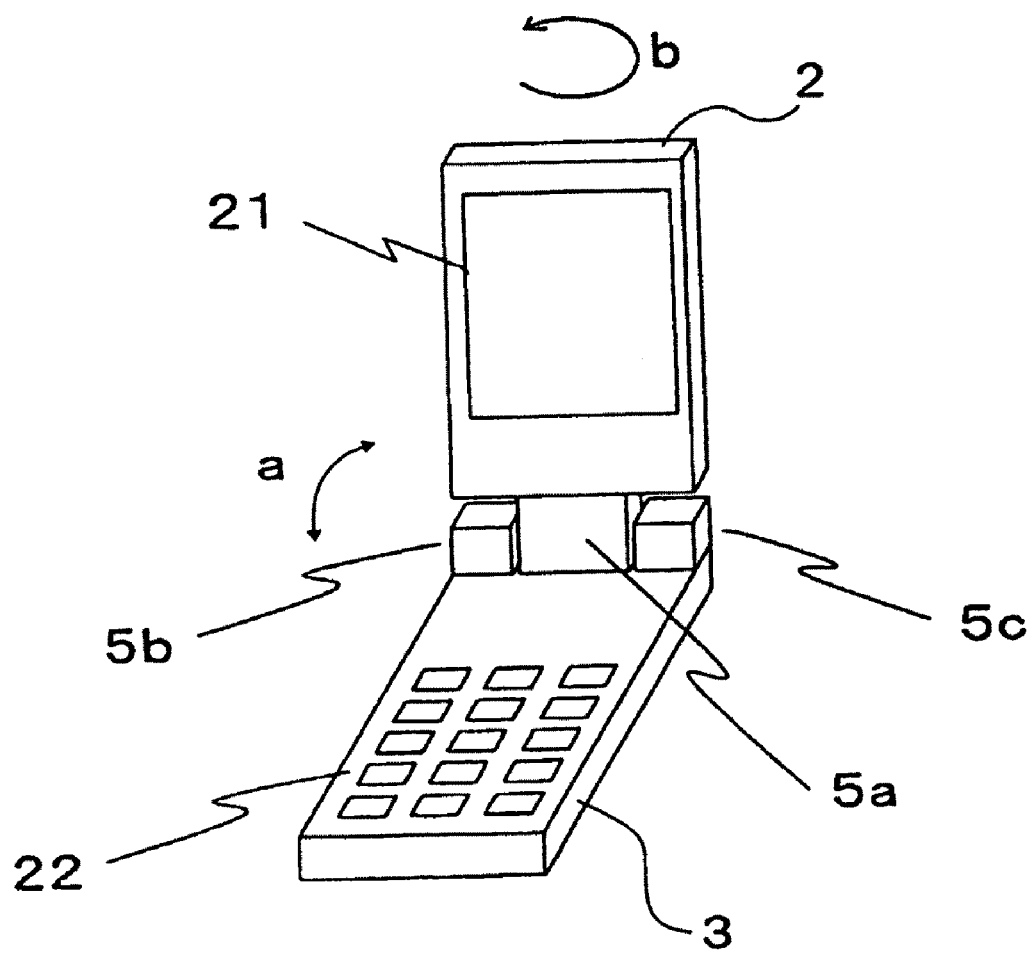
FIG. 28 is a schematic perspective view of a cellular phone according to exemplary embodiment 4.

FIG. 28 is a general perspective view of a cellular phone whose upper casing 2 and lower casing 3 are openably and closably and rotatably connected to each other. In the illustrated cellular phone, upper casing 2 is openable and closable in the directions indicated by arrow (a) with respect to lower casing 3, and is also rotatable in the direction indicated by arrow (b) with respect to lower casing 3. While the opening and closing movement in the directions indicated by arrow (a) may be interpreted as rotation in the same directions, the terms "opening and closing movement" and "rotation" are separately used herein for illustrated purposes.

With the illustrated cellular phone, when upper casing 2 is opened through a predetermined angle (about 90°) with respect to lower casing 3, upper casing 2 is rendered rotatable in the direction indicated by the arrow b about a rotational shaft (not shown) disposed in half hinge 5a. Half hinge 5a is rotatably supported by the rotational shaft (not shown) which extends between half hinges 5b, 5c disposed one on each side of half hinge 5a.

The cellular phone with the above mechanism according to the present exemplary embodiment can have its folded state switched between (i) a state in which LCD panel 21 on upper casing 2 faces key pad 22 on lower casing 3 and (ii) a state in which the rear surface of upper casing 2 faces key pad 22 on lower casing 3.

FIGS. 29(a) through 29(c) show the manner in which electromagnetic field control plates are disposed in the cellular phone according to the present exemplary embodiment. As shown in these figures, first control plate 10 is disposed on an area of the inner wall of upper casing 2 below LCD panel 21. Second control plate 11 is disposed on an area of an inner wall surface of lower casing 3 above a key pad, not shown, and on inner wall surfaces of half hinges 5b, 5c (FIG. 28). Third control plate 30 is disposed on an inner wall surface of half hinge 5a (FIG. 28) of upper casing 2. First control plate 10 corresponds to a first reflective member according to the present invention, second control plate 11 to a second reflective member, and third control plate 30 to a third reflective member.

With the cellular phone according to the present exemplary embodiment, as described above, upper casing 2 is rotatable about half hinge 5a (FIG. 28). First control plate 10 mounted on the inner wall surface of upper casing 2 and third control plate 30 mounted on the inner wall surface of half hinge 5a are independent of each other. Second control plate 11 mounted on the inner wall surface of lower casing 2 is independent of first and third control plates 10, 30. In other words, first through third control plates 10, 11, 30 are independent of each other and out of direct contact with each other.

Figure 29:
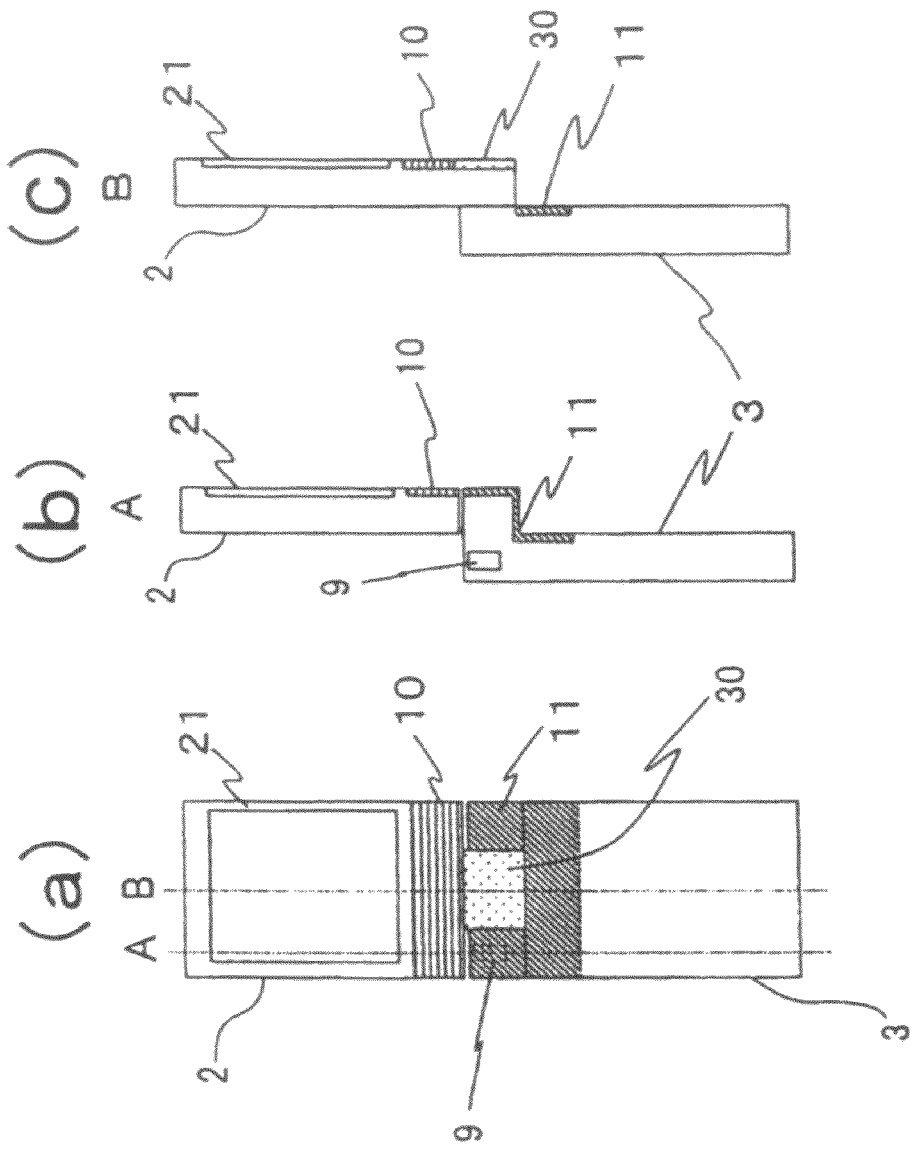
FIG. 29 is a set of schematic views showing the manner in which electromagnetic field control plates are disposed when the cellular phone shown in FIG. 28 is unfolded, FIG. 29(a) being a front elevational view and FIGS. 29(b) and 29(c) being different cross-sectional views.

However, when the cellular phone is unfolded as shown in FIG. 29, first through third control plates 10, 11, 30 are substantially combined integrally with each other and function as a substantially single electromagnetic field control plate for the electromagnetic waves radiated from an antenna, not shown. At this time, first through third control plates 10, 11, 30 have a maximum projected area on the inner wall surfaces of upper and lower casings 2, 3 near their rear surfaces (see FIG. 29(b)).

Figure 30:
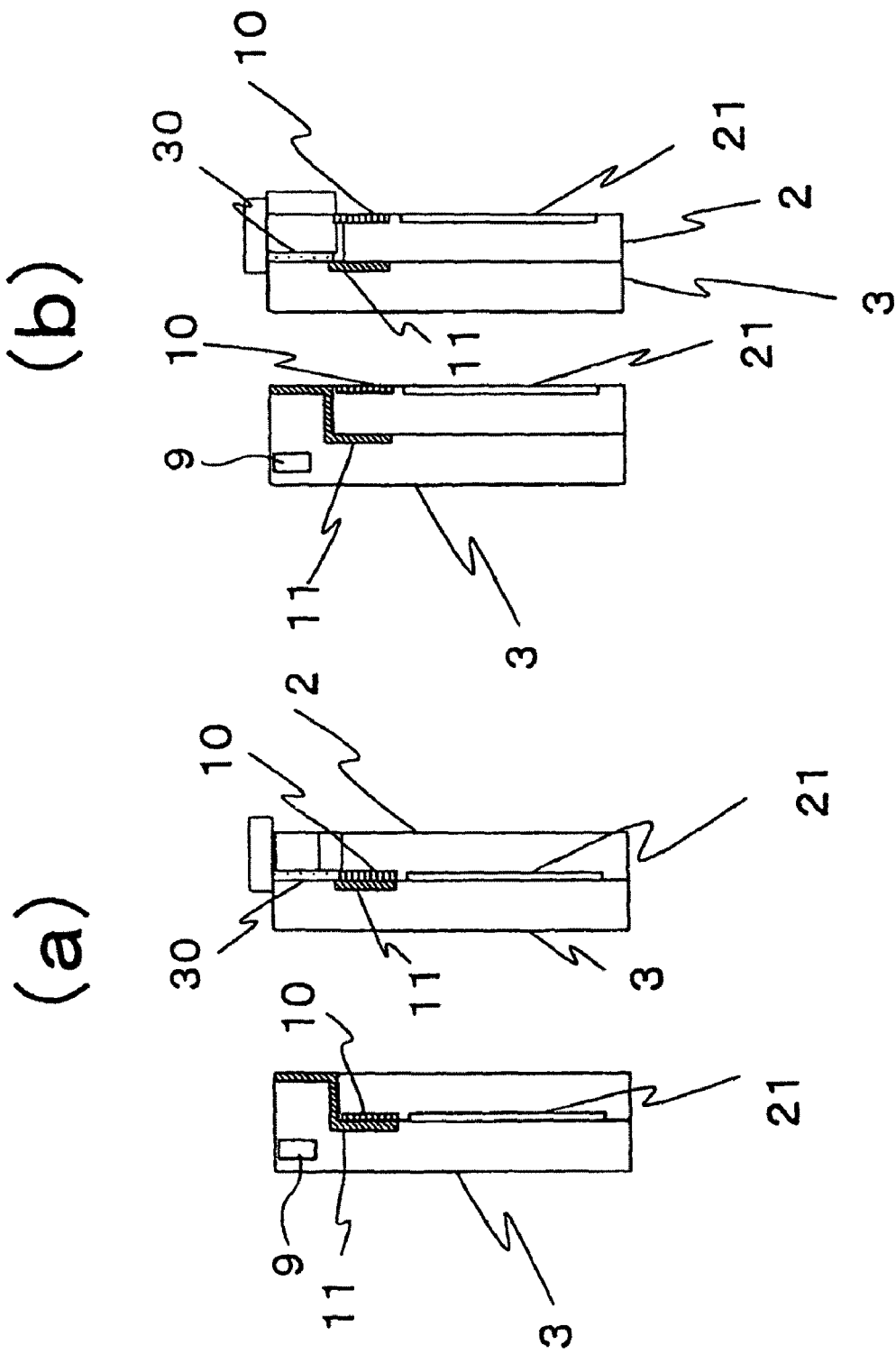
FIG. 30 is a set of schematic cross-sectional views showing the manner in which the electromagnetic field control plates are disposed when the cellular phone shown in FIG. 28 is folded.

FIG. 30 shows the cellular phone shown in FIG. 28 when it is folded. More specifically, FIG. 30(a) shows different cross sections in a folded state in which LCD surface 21 and key pad 22 face each other. FIG. 30(b) shows different cross sections in a folded state in which upper casing 2 is rotated 180° in the direction indicated by arrow (b), i.e., in a folded state in which the rear surface of upper casing 2 faces key pad 22 on lower casing 2.

A comparison of FIGS. 29 and 30 clearly indicates that in either of the above folded states, first through third control plates 10, 11, 30 are not continuously combined, and the projected area thereof on the inner wall surfaces of upper and lower casings 2, 3 is smaller than when the cellular phone is unfolded.

As described above, the present invention is applicable to a cellular phone whose upper casing and lower casing are openably and closably and rotatably connected to each other, and the cellular phone operates in the same manner and offers the same advantages as those described above.

Exemplary Embodiment 5

The present invention is also applicable to a cellular phone whose upper casing 2 is rotatable in a direction different from the direction indicated by arrow (b) in FIG. 28.

Figure 31:
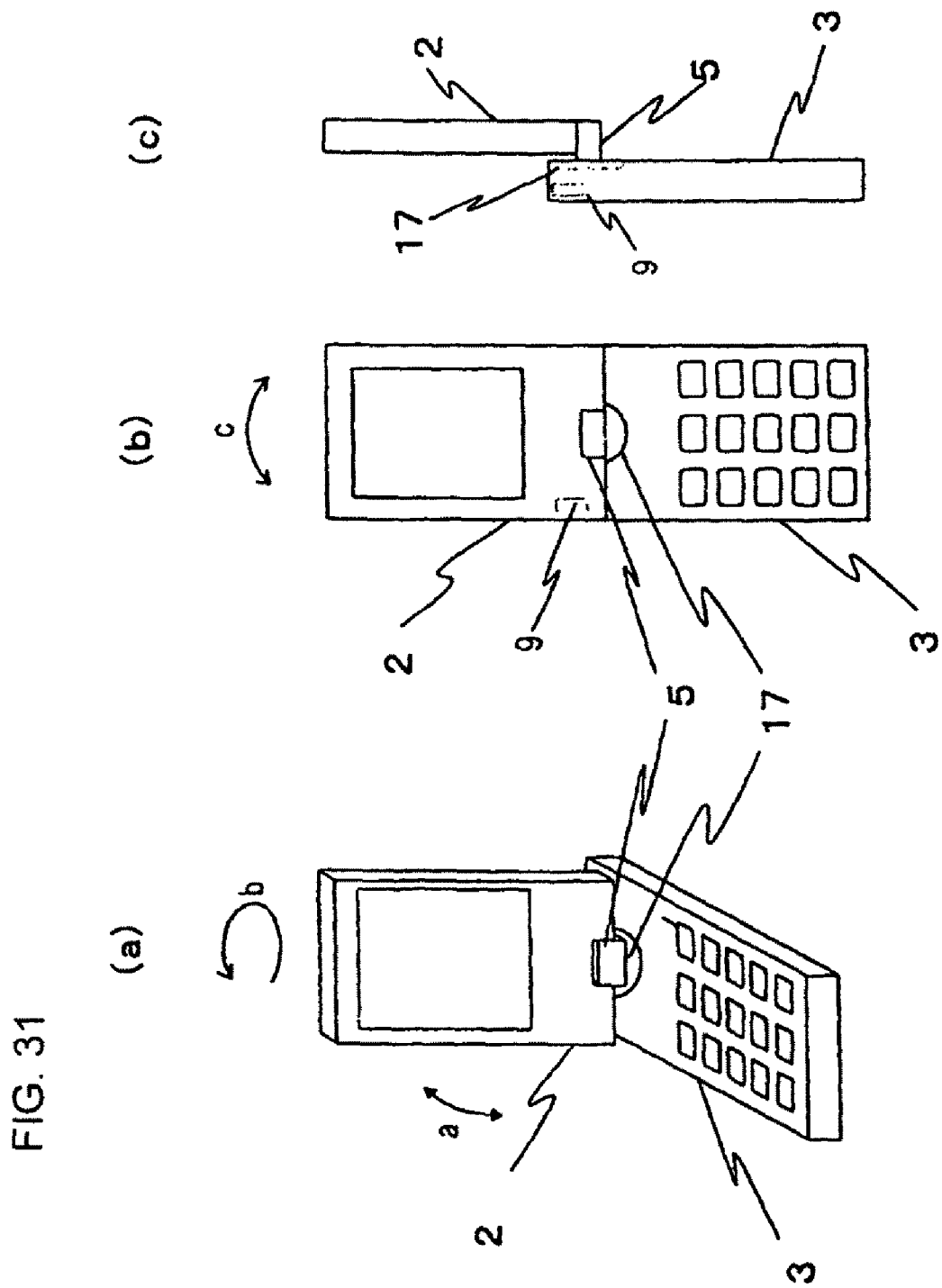
FIG. 31 is a set of schematic views of a cellular phone according to exemplary embodiment 5, FIG. 31(a) being a perspective view, FIG. 31(b) a front elevational view, and FIG. 31(c) being a side elevational view.

A cellular phone shown in FIG. 31 has hinge 5 mounted on a rotor 17 disposed on lower casing 3. Upper casing 2 is coupled to lower casing 3 by a coupling mechanism which comprises rotor 17 and hinge 5, and is openable and closable and rotatable in the directions indicated by the arrows a, b, c in FIG. 31. Specifically, upper casing 2 is openable and closable in the directions indicated by arrow (a), rotatable in the direction indicated by arrow (b), and rotatable in a plane parallel to the front surface.

Rotor 17 incorporates a lock mechanism which is actuatable in ganged relation to the angle through which upper casing 2 is opened and closed. As shown FIG. 31(a), when the angle formed between the front surface of upper casing 2 and the front surface of lower casing 3 is about 90°, rotor 17 is locked by the lock mechanism. In this state, upper casing 2 is rotatable only in the direction indicated by the arrow b. When the above angle is about 180° (when the cellular phone is in the unfolded state), as shown in FIGS. 31(b) and 31(c), the lock mechanism unlocks rotor 17. In this state, upper casing 2 is rotatable in the directions indicated by arrow (c). Antenna 9, not shown, is disposed in an upper left area of lower casing 3.

FIGS. 32(a) and 32(b) show the manner in which electromagnetic field control plates are disposed in the cellular phone shown in FIG. 31. As shown in these figures, first control plate 10 is disposed on an area of the inner wall of upper casing 2 below LCD panel 21. Second control plate 11 is disposed on an area (including a portion of rotor 17) of an inner wall surface of lower casing 3 above key pad 22. Third control plate 30 is disposed on an inner wall surface of half hinge 5. First control plate 10 corresponds to a first reflective member according to the present invention, second control plate 11 to a second reflective member, and third control plate 30 to a third reflective member.

When the cellular phone is in the unfolded state (during the call), as shown in FIG. 32(a), first through third control plates 10, 11, 30 are substantially combined integrally with each other and function as a substantially single electromagnetic field control plate for the electromagnetic waves radiated from antenna 9. At this time, first through third control plates 10, 11, 30 have a maximum projected area on the inner wall surfaces of upper and lower casings 2, 3 near their rear surfaces.

When upper casing 2 is rotated in the directions indicated by the arrow c, as shown in FIG. 32(b), hinge 5 is also rotated in unison with upper casing 2 in the same directions. As a result, first control plate 10 is retracted from a position facing antenna 9. When the cellular phone is in the unfolded state shown in FIG. 32(b), it is used in many cases for the user to see LCD panel 21, rather than making calls. Therefore, when the cellular phone is in the unfolded state shown in FIG. 32(b), antenna 9 may not be covered with an electromagnetic field control plate.

When the cellular phone is in the folded state, not shown, first through third control plates 10, 11, 30 are not continuously combined, and the projected area thereof on the inner wall surfaces of upper and lower casings 2, 3 is smaller than when the cellular phone is unfolded.

The exemplary embodiments of the cellular phones according to the present invention have been described by way of example. However, the present invention is not limited to above exemplary embodiments 1 through 5.

In view of the operation and advantages of the present invention that have been made clear by the above description, it can be understood that two or more control plates may partially overlap each other when the cellular phone is unfolded. In the above exemplary embodiments, the antenna is disposed in the upper casing. However, the antenna is not limited to any particular position. The operation and advantages of the present invention can be maximized by optimizing the relative positional relationship between the antenna and the control plates. Therefore, the antenna may be disposed in either the upper casing or the lower casing, or the hinge assembly. For example, whereas the antenna is disposed in the left half hinge of the upper casing according to exemplary embodiment 1, the antenna may be disposed centrally in the upper casing or in the half hinge of the lower casing.

The reflective members according to the present invention include pliable plates, thin films, sheets, or the like. The reflective members may be mounted on wall surfaces in the casings or may directly be formed on wall surfaces in the casings by evaporation or plating. Therefore, the reflective members can be provided even if the wall surfaces in the casings have relatively complex shapes.

In the above exemplary embodiments, the control plates are mounted on the inner wall surfaces of the casings. However, the control plates may be disposed in spaces within the casings or may be disposed outside of the casings (on surfaces of the casings). Alternatively, the casings themselves may be formed of control plates.

In the above exemplary embodiments, a reflective member comprises, by way of example, a control plate having a two-layer structure comprising a metal sheet and a magnetic layer disposed thereon. However, a reflective member may be of a single-layer structure made of metal or magnetic material. Alternatively, a reflective member may comprise a metal layer and a magnetic layer disposed on the entire surface or a partial surface of the metal layer, or a magnetic layer and a metal layer disposed on the entire surface or a partial surface of the magnetic layer, or a layer including a metal region and a magnetic region therein. A reflective member may have any of the above structures wherein a dielectric material is used in place of the magnetic material. If a dielectric material is used, then the dielectric material should desirably have a dielectric constant greater than the dielectric constant of the casings for a higher reflective effect.

The upper and lower casings are not limited to the structures illustrated in the above exemplary embodiments. The upper and lower casings may be partly made of metal.

The reflective members should preferably cover a relatively wide area including the area in which the antenna is installed. However, the area covered with the reflective members is not limited to the areas according to the above exemplary embodiments, but may be any area insofar as the reflective members can reflect the electromagnetic waves radiated from the antenna to reduce the electromagnetic field behind the reflective members. For example, a reflective member may be disposed in only the half hinge of the upper casing or in the lower casing, or a reflective member may be disposed in only either the upper casing or the lower casing.

The present application claims priority based on Japanese patent application No. 2007-3603 filed on Jan. 11, 2007, and incorporates herein the entire disclosure thereof by reference.

The invention claimed is:

1. A cellular phone, comprising:
a first casing having a front surface with at least a display panel disposed thereon;
a second casing having a front surface with at least operating keys disposed thereon;
an antenna disposed in said first casing or said second casing, said first casing and said second casing being openably and closably coupled to each other;
a first reflective member for reflecting electromagnetic waves, said first reflective member being disposed in said first casing; and
a second reflective member for reflecting electromagnetic waves, said second reflective member being disposed in said second casing;
wherein said first reflective member and said second reflective member comprise different members which are independent of each other; and
wherein when said cellular phone is in an unfolded state in which an angle formed between said front surface of said first casing and said front surface of said second casing is maximum, said first reflective member and said second reflective member are disposed so as to extend across an area where said first casing and said second casing are coupled to each other so that said first reflective member and said second reflective member function as a substantially single electromagnetic field control plate.

2. The cellular phone according to claim 1, further comprising a third reflective member for reflecting electromagnetic waves, either said first reflective member or said second reflective member being held in contact with said third reflective member at all times, and the other of said first reflective member and said second reflective member being held in contact with said third reflective member only when said cellular phone is in said unfolded state.

3. The cellular phone according to claim 2, wherein at least one from among said first reflective member, said second reflective member and said third reflective member is disposed in a position facing said antenna.

4. The cellular phone according to claim 2, wherein at least one from among said first reflective member, said second reflective member and said third reflective member comprises a flat portion disposed on a flat portion of said first casing and said second casing and a curved portion disposed on a curved portion of of said first casing and said second casing.

5. The cellular phone according to claim 4, wherein said curved portion of said first casing and said second casing comprises an inner wall surface of said hinge.

6. The cellular phone according to claim 2, wherein at least one from among said first reflective member, said second reflective member and said third reflective member comprises a single-layer structure of metal or magnetic material or a multilayer structure comprising a stack of a metal layer and a magnetic layer.

7. The cellular phone according to claim 2, wherein at least one from among said first reflective member, said second reflective member and said third reflective member comprises a reflective member including a metal layer and a magnetic layer disposed on an entire surface or a partial surface of said metal layer.

8. The cellular phone according to claim 2, wherein at least one from among said first reflective member, said second reflective member and said third reflective member comprises a reflective member including a magnetic layer and a metal layer disposed on an entire surface or a partial surface of said magnetic layer.

9. The cellular phone according to claim 2, wherein at least one from among said first reflective member, said second reflective member and said third reflective member comprises a layer including a metal region and a magnetic region therein.

10. The cellular phone according to claim 2, wherein neither said first reflective member, nor said second reflective member, nor said third reflective member are connected to a ground level of a circuit board included in the cellular phone.

11. The cellular phone according to claim 2, wherein a part of at least one from among said first casing and said second casing is formed of at least one from among said first reflective member, said second reflective member and said third reflective member.

12. The cellular phone according to claim 1, further comprising a third reflective member for reflecting electromagnetic waves, wherein said first reflective member, said second reflective member, and said third reflective member comprise independent different members which are held out of contact with each other even when said cellular phone is in said unfolded state.

13. The cellular phone according to claim 1, further comprising a hinge by which said first casing and said second casing are openably and closably coupled to each other, said antenna being disposed near said hinge.

14. The cellular phone according to claim 1, wherein said first reflective member is disposed on an inner wall surface of said first casing which is close to said front surface thereof, and said second reflective member is disposed on an inner wall surface of said second casing which is close to said front surface thereof.

15. A cellular phone comprising:
a first casing having a front surface with at least a display panel disposed thereon;
a second casing having a front surface with at least operating keys disposed thereon;
an antenna disposed in said first casing or said second casing, said first casing and said second casing being openably and closably coupled to each other;
a reflective member for reflecting electromagnetic waves, said reflective member being disposed in one of said first casing and said second casing;
wherein said reflective member comprises a flat portion and a curved portion, said flat portion being disposed on a flat portion of said one of said first casing and said second casing, said curved portion being disposed on a curved portion of said of said first casing and said second casing,
wherein when said cellular phone is in an unfolded state in which an angle formed between said front surface of said first casing and said front surface of said second casing is maximum, a magnetic field on a side of said reflective member which is remote from said antenna being smaller than a magnetic field on a side of said reflective member which is close to said antenna.

16. The cellular phone according to claim 15, wherein said reflective member is disposed in a position facing said antenna.

17. The cellular phone according to claim 15, wherein said reflective member has a single-layer structure of metal or magnetic material or a multilayer structure comprising a stack of a metal layer and a magnetic layer.

18. The cellular phone according to claim 15, wherein said reflective member comprises a reflective member including a metal layer and a magnetic layer disposed on an entire surface or a partial surface of said metal layer.

19. The cellular phone according to claim 15, wherein said reflective member comprises a reflective member including a magnetic layer and a metal layer disposed on an entire surface or a partial surface of said magnetic layer.

20. The cellular phone according to claim 15, wherein said reflective member comprises a layer including a metal region and a magnetic region therein.

21. The cellular phone according to claim 15, wherein said reflective member is not connected to a ground level of a circuit board included in the cellular phone.

22. The cellular phone according to claim 15, wherein a part of at least one from among said first casing and said second casing is formed of said reflective member.

* * * * *